US008793575B1

(12) United States Patent
Lattyak et al.

(10) Patent No.: US 8,793,575 B1
(45) Date of Patent: Jul. 29, 2014

(54) PROGRESS INDICATION FOR A DIGITAL WORK

(75) Inventors: John Lattyak, Los Gatos, CA (US); John T. Kim, La Canada, CA (US); Steven K. Moy, San Francisco, CA (US); Laurent An Minh Nguyen, Los Altos, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 13/294,803

(22) Filed: Nov. 11, 2011

Related U.S. Application Data

(63) Continuation of application No. 11/693,685, filed on Mar. 29, 2007.

(51) Int. Cl.
*G06F 17/21* (2006.01)

(52) U.S. Cl.
USPC ....................................................... 715/273

(58) Field of Classification Search
USPC ....................................................... 715/273
See application file for complete search history.

(56) References Cited

U.S. PATENT DOCUMENTS

| | | | |
|---|---|---|---|
| 4,622,627 A | 11/1986 | Rodriguez et al. | |
| 5,418,549 A * | 5/1995 | Anderson et al. | 715/786 |
| 5,517,407 A | 5/1996 | Weiner | |
| 5,544,305 A | 8/1996 | Ohmaye et al. | |
| 5,566,098 A | 10/1996 | Lucente et al. | |
| 5,623,260 A | 4/1997 | Jones | |
| 5,630,159 A | 5/1997 | Zancho | |
| 5,640,553 A | 6/1997 | Schultz | |
| 5,659,742 A | 8/1997 | Beattie et al. | |
| 5,661,635 A * | 8/1997 | Huffman et al. | 361/679.32 |
| 5,663,748 A | 9/1997 | Huffman et al. | |
| 5,710,922 A | 1/1998 | Alley et al. | |
| 5,742,905 A | 4/1998 | Pepe et al. | |
| 5,761,485 A | 6/1998 | Munyan | |
| 5,765,168 A | 6/1998 | Burrows | |
| 5,774,109 A * | 6/1998 | Winksy et al. | 345/685 |
| 5,813,017 A | 9/1998 | Morris | |
| 5,845,278 A | 12/1998 | Kirsch et al. | |
| 5,847,698 A | 12/1998 | Reavey et al. | |
| 5,892,900 A | 4/1999 | Ginter et al. | |
| 5,923,861 A * | 7/1999 | Bertram et al. | 715/786 |
| 5,930,026 A * | 7/1999 | Jacobson et al. | 359/296 |

(Continued)

FOREIGN PATENT DOCUMENTS

| | | |
|---|---|---|
| CN | 1362682 | 8/2002 |
| CN | 1841373 | 10/2006 |

(Continued)

OTHER PUBLICATIONS

Palm Reader Handbook; 2002; Palm, Inc.; pp. 1-30.*

(Continued)

*Primary Examiner* — Andrew Dyer
(74) *Attorney, Agent, or Firm* — Lee & Hayes, PLLC

(57) ABSTRACT

A user's progress through a digital work may be presented using a progress bar. The progress bar may display a visualization of consumed text of the digital work with respect to unconsumed text of the digital work. An expanded portion of the progress bar may also be displayed. A reading rate associated with the user's consumption of the digital work and a consumption time of the digital work may be presented.

19 Claims, 8 Drawing Sheets

(56) References Cited

U.S. PATENT DOCUMENTS

| | | |
|---|---|---|
| 5,940,846 A | 8/1999 | Akiyama |
| 5,956,048 A | 9/1999 | Gaston |
| 5,960,411 A | 9/1999 | Hartman et al. |
| 5,973,681 A | 10/1999 | Tanigawa et al. |
| 6,018,575 A | 1/2000 | Gross et al. |
| 6,034,839 A | 3/2000 | Hamming |
| 6,037,954 A | 3/2000 | McMahon |
| 6,041,335 A | 3/2000 | Merritt et al. |
| 6,047,189 A | 4/2000 | Yun et al. |
| 6,049,796 A | 4/2000 | Siitonen et al. |
| 6,064,980 A | 5/2000 | Jacobi et al. |
| 6,073,148 A | 6/2000 | Rowe et al. |
| 6,113,394 A * | 9/2000 | Edgar ............................ 434/179 |
| 6,148,340 A | 11/2000 | Bittinger et al. |
| 6,154,757 A | 11/2000 | Krause et al. |
| 6,164,974 A | 12/2000 | Carlile et al. |
| 6,201,771 B1 | 3/2001 | Otsuka et al. |
| 6,233,318 B1 | 5/2001 | Picard et al. |
| 6,300,947 B1 | 10/2001 | Kanevsky |
| 6,308,320 B1 | 10/2001 | Burch |
| 6,313,828 B1 | 11/2001 | Chombo |
| 6,331,867 B1 | 12/2001 | Eberhard et al. |
| 6,335,678 B1 | 1/2002 | Heutschi |
| 6,351,750 B1 | 2/2002 | Duga et al. |
| 6,385,596 B1 | 5/2002 | Wiser et al. |
| 6,401,086 B1 | 6/2002 | Bruckner |
| 6,401,239 B1 | 6/2002 | Miron |
| 6,442,651 B2 | 8/2002 | Crow et al. |
| 6,449,627 B1 | 9/2002 | Baer et al. |
| 6,457,030 B1 | 9/2002 | Adams et al. |
| 6,466,951 B1 | 10/2002 | Birkler et al. |
| 6,484,212 B1 | 11/2002 | Markowitz et al. |
| 6,493,734 B1 | 12/2002 | Sachs et al. |
| 6,496,803 B1 | 12/2002 | Seet et al. |
| 6,529,920 B1 | 3/2003 | Arons et al. |
| 6,535,857 B1 | 3/2003 | Clarke, III et al. |
| 6,542,874 B1 | 4/2003 | Walker et al. |
| 6,560,699 B1 | 5/2003 | Konkle |
| 6,629,138 B1 | 9/2003 | Lambert et al. |
| 6,631,495 B2 | 10/2003 | Kato et al. |
| 6,642,947 B2 | 11/2003 | Feierbach |
| 6,658,623 B1 | 12/2003 | Schilit et al. |
| 6,685,482 B2 | 2/2004 | Hopp et al. |
| 6,687,878 B1 | 2/2004 | Eintracht et al. |
| 6,704,733 B2 | 3/2004 | Clark et al. |
| 6,721,869 B1 | 4/2004 | Senthil |
| 6,724,403 B1 | 4/2004 | Santoro et al. |
| 6,725,227 B1 | 4/2004 | Li |
| 6,726,487 B1 * | 4/2004 | Dalstrom ...................... 434/178 |
| 6,735,583 B1 | 5/2004 | Bjarnestam et al. |
| 6,744,891 B1 | 6/2004 | Allen |
| 6,744,967 B2 * | 6/2004 | Kaminski et al. ............. 386/243 |
| 6,801,751 B1 * | 10/2004 | Wood et al. .................... 434/362 |
| 6,804,489 B2 * | 10/2004 | Stuppy et al. .................. 434/350 |
| 6,829,594 B1 | 12/2004 | Kitamura |
| 6,847,966 B1 | 1/2005 | Sommer et al. |
| 6,904,449 B1 | 6/2005 | Quinones |
| 6,912,398 B1 | 6/2005 | Domnitz |
| 6,933,928 B1 | 8/2005 | Lilienthal |
| 6,938,076 B2 | 8/2005 | Meyer et al. |
| 6,947,922 B1 | 9/2005 | Glance |
| 6,948,135 B1 | 9/2005 | Ruthfield et al. |
| 6,953,343 B2 * | 10/2005 | Townshend ................... 434/178 |
| 6,985,932 B1 | 1/2006 | Glaser et al. |
| 6,999,565 B1 | 2/2006 | Delaney et al. |
| 7,007,015 B1 | 2/2006 | Nayak |
| 7,009,596 B2 | 3/2006 | Seet et al. |
| 7,010,500 B2 | 3/2006 | Aarnio |
| 7,020,654 B1 | 3/2006 | Najmi |
| 7,020,663 B2 * | 3/2006 | Hay et al. ...................... 434/317 |
| 7,054,914 B2 | 5/2006 | Suzuki et al. |
| 7,057,591 B1 | 6/2006 | Hautanen et al. |
| 7,062,707 B1 | 6/2006 | Knauft et al. |
| 7,071,930 B2 * | 7/2006 | Kondo et al. .................. 345/204 |
| 7,089,292 B1 | 8/2006 | Roderick et al. |
| 7,092,116 B2 | 8/2006 | Calaway |
| 7,103,848 B2 | 9/2006 | Barsness et al. |
| 7,107,533 B2 | 9/2006 | Duncan et al. |
| 7,130,841 B1 | 10/2006 | Goel et al. |
| 7,133,506 B1 | 11/2006 | Smith |
| 7,135,932 B2 | 11/2006 | Quadir et al. |
| 7,149,776 B1 | 12/2006 | Roy et al. |
| 7,165,217 B1 | 1/2007 | Kondo |
| 7,188,085 B2 | 3/2007 | Pelletier |
| 7,209,888 B2 | 4/2007 | Frid-Nielsen et al. |
| 7,216,116 B1 * | 5/2007 | Nilsson et al. ......................... 1/1 |
| 7,237,123 B2 | 6/2007 | LeVine et al. |
| 7,246,118 B2 | 7/2007 | Chastain et al. |
| 7,249,046 B1 | 7/2007 | Katsurabayashi et al. |
| 7,249,060 B2 | 7/2007 | Ling |
| 7,249,324 B2 | 7/2007 | Nakamura et al. |
| 7,257,577 B2 | 8/2007 | Fagin et al. |
| 7,287,068 B1 | 10/2007 | Eriksson et al. |
| 7,290,285 B2 | 10/2007 | McCurdy et al. |
| 7,298,851 B1 | 11/2007 | Hendricks et al. |
| 7,304,635 B2 | 12/2007 | Seet et al. |
| 7,310,629 B1 | 12/2007 | Mendelson et al. |
| 7,313,759 B2 | 12/2007 | Sinisi |
| 7,340,436 B1 | 3/2008 | Lilge |
| 7,350,704 B2 | 4/2008 | Barsness et al. |
| 7,355,591 B2 | 4/2008 | Sugimoto |
| 7,375,649 B2 | 5/2008 | Gueziec |
| 7,383,505 B2 | 6/2008 | Shimizu et al. |
| 7,386,480 B2 | 6/2008 | Sarig |
| 7,386,804 B2 | 6/2008 | Ho et al. |
| 7,398,244 B1 | 7/2008 | Keith |
| 7,401,286 B1 | 7/2008 | Hendricks et al. |
| 7,454,238 B2 | 11/2008 | Vinayak et al. |
| 7,496,767 B2 | 2/2009 | Evans |
| 7,506,246 B2 | 3/2009 | Hollander et al. |
| 7,506,356 B2 * | 3/2009 | Gupta et al. ................... 725/116 |
| 7,509,270 B1 | 3/2009 | Hendricks et al. |
| 7,533,152 B2 | 5/2009 | Stark et al. |
| 7,539,478 B2 | 5/2009 | Herley et al. |
| 7,562,032 B2 | 7/2009 | Abbosh et al. |
| 7,574,653 B2 | 8/2009 | Croney et al. |
| 7,631,013 B2 | 12/2009 | Parsons et al. |
| 7,634,429 B2 | 12/2009 | Narin et al. |
| 7,656,127 B1 | 2/2010 | Shutt et al. |
| 7,657,459 B2 | 2/2010 | Anderson et al. |
| 7,657,831 B2 | 2/2010 | Donahue |
| 7,680,849 B2 | 3/2010 | Heller et al. |
| 7,716,224 B2 | 5/2010 | Reztlaff, II et al. |
| 7,720,892 B1 | 5/2010 | Healey, Jr. et al. |
| 7,760,986 B2 | 7/2010 | Beuque |
| 7,788,369 B2 | 8/2010 | McAllen et al. |
| 7,792,756 B2 | 9/2010 | Plastina et al. |
| 7,835,989 B1 | 11/2010 | Hendricks et al. |
| 7,849,393 B1 | 12/2010 | Hendricks et al. |
| 7,865,405 B2 | 1/2011 | Hendricks et al. |
| 7,865,567 B1 | 1/2011 | Hendricks et al. |
| 7,870,022 B2 | 1/2011 | Bous et al. |
| 7,900,133 B2 | 3/2011 | Cragun et al. |
| 7,908,628 B2 | 3/2011 | Swart et al. |
| 8,131,647 B2 | 3/2012 | Siegel et al. |
| 8,165,998 B2 | 4/2012 | Semerdzhiev |
| 8,209,623 B2 * | 6/2012 | Barletta et al. ................. 715/776 |
| 8,260,915 B1 * | 9/2012 | Ashear .......................... 709/224 |
| 8,312,096 B2 | 11/2012 | Cohen et al. |
| 8,341,210 B1 | 12/2012 | Lattyak et al. |
| 8,417,772 B2 | 4/2013 | Lin et al. |
| 8,429,028 B2 | 4/2013 | Hendricks et al. |
| 8,452,797 B1 | 5/2013 | Paleja et al. |
| 8,510,247 B1 | 8/2013 | Kane, Jr. et al. |
| 2001/0007980 A1 | 7/2001 | Ishibashi et al. |
| 2001/0025302 A1 | 9/2001 | Suzuki et al. |
| 2001/0027450 A1 | 10/2001 | Shinoda et al. |
| 2001/0027478 A1 | 10/2001 | Meier et al. |
| 2001/0036822 A1 | 11/2001 | Mead et al. |
| 2001/0037328 A1 | 11/2001 | Pustejovsky et al. |
| 2001/0039493 A1 | 11/2001 | Pustejovsky et al. |
| 2001/0049623 A1 | 12/2001 | Aggarwal et al. |
| 2001/0053975 A1 | 12/2001 | Kurihara |
| 2002/0002540 A1 | 1/2002 | DeMello et al. |

(56) References Cited

U.S. PATENT DOCUMENTS

| | | |
|---|---|---|
| 2002/0010707 A1 | 1/2002 | Chang et al. |
| 2002/0010759 A1 | 1/2002 | Hitson et al. |
| 2002/0012134 A1 | 1/2002 | Calaway |
| 2002/0026443 A1 | 2/2002 | Chang et al. |
| 2002/0035697 A1 | 3/2002 | McCurdy et al. |
| 2002/0046261 A1 | 4/2002 | Iwata et al. |
| 2002/0054059 A1 | 5/2002 | Schneiderman |
| 2002/0059415 A1 | 5/2002 | Chang et al. |
| 2002/0069222 A1 | 6/2002 | McNeely |
| 2002/0069312 A1 | 6/2002 | Jones |
| 2002/0087532 A1 | 7/2002 | Barritz et al. |
| 2002/0090934 A1 | 7/2002 | Mitchelmore |
| 2002/0091584 A1 | 7/2002 | Clark et al. |
| 2002/0092031 A1 | 7/2002 | Dudkiewicz et al. |
| 2002/0095468 A1 | 7/2002 | Sakata |
| 2002/0101447 A1 | 8/2002 | Carro |
| 2002/0103809 A1 | 8/2002 | Starzl et al. |
| 2002/0120635 A1 | 8/2002 | Joao |
| 2002/0123336 A1 | 9/2002 | Kamada |
| 2002/0129012 A1 | 9/2002 | Green |
| 2002/0138291 A1 | 9/2002 | Vaidyanathan et al. |
| 2002/0138649 A1 | 9/2002 | Cartmell et al. |
| 2002/0143822 A1 | 10/2002 | Brid et al. |
| 2002/0147724 A1 | 10/2002 | Fries et al. |
| 2002/0184319 A1 | 12/2002 | Willner et al. |
| 2002/0194474 A1 | 12/2002 | Natsuno et al. |
| 2003/0009459 A1 | 1/2003 | Chastain et al. |
| 2003/0012216 A1 | 1/2003 | Novaes |
| 2003/0018720 A1 | 1/2003 | Chang et al. |
| 2003/0025731 A1 | 2/2003 | Chastain et al. |
| 2003/0028395 A1 | 2/2003 | Rodgers et al. |
| 2003/0040970 A1 | 2/2003 | Miller |
| 2003/0046233 A1 | 3/2003 | Ara et al. |
| 2003/0052928 A1 | 3/2003 | Williams |
| 2003/0058265 A1 | 3/2003 | Robinson et al. |
| 2003/0065642 A1 | 4/2003 | Zee |
| 2003/0069812 A1 | 4/2003 | Yuen et al. |
| 2003/0076513 A1 | 4/2003 | Sugimoto et al. |
| 2003/0093312 A1 | 5/2003 | Ukita et al. |
| 2003/0093382 A1 | 5/2003 | Himeno et al. |
| 2003/0097354 A1 | 5/2003 | Finlay et al. |
| 2003/0105679 A1 | 6/2003 | Krishnan et al. |
| 2003/0110503 A1 | 6/2003 | Perkes |
| 2003/0126123 A1 | 7/2003 | Kodama |
| 2003/0129963 A1 | 7/2003 | Nurcahya |
| 2003/0135495 A1 | 7/2003 | Vagnozzi |
| 2003/0152894 A1 | 8/2003 | Townshend |
| 2003/0163399 A1 | 8/2003 | Harper et al. |
| 2003/0164844 A1 | 9/2003 | Kravitz et al. |
| 2003/0182551 A1 | 9/2003 | Frantz et al. |
| 2003/0190145 A1 | 10/2003 | Copperman et al. |
| 2003/0191737 A1 | 10/2003 | Steele et al. |
| 2003/0204496 A1 | 10/2003 | Ray et al. |
| 2003/0212613 A1 | 11/2003 | Sarig |
| 2004/0002943 A1 | 1/2004 | Merrill et al. |
| 2004/0003344 A1 | 1/2004 | Lai et al. |
| 2004/0003398 A1 | 1/2004 | Donian et al. |
| 2004/0015467 A1 | 1/2004 | Fano |
| 2004/0023191 A1* | 2/2004 | Brown et al. ................. 434/156 |
| 2004/0030686 A1 | 2/2004 | Cardno et al. |
| 2004/0044723 A1 | 3/2004 | Bell et al. |
| 2004/0054499 A1 | 3/2004 | Starzyk et al. |
| 2004/0068471 A1 | 4/2004 | Kato |
| 2004/0078273 A1 | 4/2004 | Loeb et al. |
| 2004/0078757 A1 | 4/2004 | Golovchinsky et al. |
| 2004/0081300 A1 | 4/2004 | Takae et al. |
| 2004/0098350 A1 | 5/2004 | Labrou et al. |
| 2004/0117189 A1 | 6/2004 | Bennett |
| 2004/0120280 A1 | 6/2004 | Western |
| 2004/0128359 A1 | 7/2004 | Horvitz et al. |
| 2004/0139400 A1 | 7/2004 | Allam et al. |
| 2004/0167822 A1 | 8/2004 | Chasen et al. |
| 2004/0201633 A1 | 10/2004 | Barsness et al. |
| 2004/0205457 A1 | 10/2004 | Bent et al. |
| 2004/0210561 A1* | 10/2004 | Shen ................. 707/3 |
| 2004/0212941 A1 | 10/2004 | Haas et al. |
| 2004/0237033 A1 | 11/2004 | Woolf et al. |
| 2004/0243613 A1 | 12/2004 | Pourheidari |
| 2004/0252692 A1 | 12/2004 | Shim et al. |
| 2004/0254013 A1 | 12/2004 | Quraishi et al. |
| 2004/0267552 A1 | 12/2004 | Gilliam et al. |
| 2004/0268253 A1 | 12/2004 | DeMello et al. |
| 2005/0021464 A1 | 1/2005 | Lindauer et al. |
| 2005/0022113 A1 | 1/2005 | Hanlon |
| 2005/0044148 A1 | 2/2005 | Son et al. |
| 2005/0044224 A1 | 2/2005 | Jun et al. |
| 2005/0066219 A1 | 3/2005 | Hoffman et al. |
| 2005/0069225 A1 | 3/2005 | Schneider et al. |
| 2005/0069849 A1* | 3/2005 | McKinney et al. ........... 434/178 |
| 2005/0076012 A1 | 4/2005 | Manber et al. |
| 2005/0088410 A1 | 4/2005 | Chaudhri |
| 2005/0097007 A1 | 5/2005 | Alger et al. |
| 2005/0102618 A1 | 5/2005 | Naito |
| 2005/0125222 A1 | 6/2005 | Brown et al. |
| 2005/0132281 A1 | 6/2005 | Pan et al. |
| 2005/0138007 A1 | 6/2005 | Amitay |
| 2005/0138428 A1 | 6/2005 | McAllen et al. |
| 2005/0144895 A1 | 7/2005 | Grimes et al. |
| 2005/0176438 A1 | 8/2005 | Li |
| 2005/0177562 A1 | 8/2005 | Raciborski |
| 2005/0177567 A1 | 8/2005 | Hughes et al. |
| 2005/0193330 A1 | 9/2005 | Peters |
| 2005/0195975 A1 | 9/2005 | Kawakita |
| 2005/0198070 A1 | 9/2005 | Lowry |
| 2005/0222977 A1 | 10/2005 | Zhou et al. |
| 2005/0223315 A1 | 10/2005 | Shimizu et al. |
| 2005/0228836 A1 | 10/2005 | Bacastow et al. |
| 2005/0250439 A1 | 11/2005 | Leslie |
| 2005/0256822 A1 | 11/2005 | Hollingsworth |
| 2006/0004840 A1 | 1/2006 | Senda |
| 2006/0020469 A1 | 1/2006 | Rast |
| 2006/0031316 A1 | 2/2006 | Forstadius |
| 2006/0047830 A1 | 3/2006 | Nair et al. |
| 2006/0047844 A1 | 3/2006 | Deng |
| 2006/0048184 A1 | 3/2006 | Poslinski et al. |
| 2006/0057960 A1 | 3/2006 | Tran |
| 2006/0061595 A1 | 3/2006 | Goede et al. |
| 2006/0071754 A1 | 4/2006 | Tofts et al. |
| 2006/0075205 A1 | 4/2006 | Martin et al. |
| 2006/0075444 A1 | 4/2006 | Dillen |
| 2006/0080261 A1 | 4/2006 | Christal |
| 2006/0098900 A1 | 5/2006 | King et al. |
| 2006/0101328 A1 | 5/2006 | Albornoz et al. |
| 2006/0123053 A1 | 6/2006 | Scannell, Jr. |
| 2006/0129618 A1 | 6/2006 | Maier |
| 2006/0129924 A1* | 6/2006 | Nelson et al. ................. 715/530 |
| 2006/0143558 A1 | 6/2006 | Albornoz et al. |
| 2006/0156222 A1 | 7/2006 | Chi et al. |
| 2006/0161578 A1 | 7/2006 | Siegel et al. |
| 2006/0161635 A1 | 7/2006 | Lamkin et al. |
| 2006/0175983 A1 | 8/2006 | Crouse et al. |
| 2006/0179137 A1 | 8/2006 | Jennings, III et al. |
| 2006/0190489 A1 | 8/2006 | Vohariwatt et al. |
| 2006/0190568 A1 | 8/2006 | Patterson |
| 2006/0195431 A1 | 8/2006 | Holzgrafe et al. |
| 2006/0209175 A1 | 9/2006 | Cohen et al. |
| 2006/0236240 A1 | 10/2006 | Lebow |
| 2006/0250994 A1 | 11/2006 | Sasaki et al. |
| 2006/0253441 A1 | 11/2006 | Nelson |
| 2006/0253461 A1 | 11/2006 | de Bonet |
| 2006/0256083 A1 | 11/2006 | Rosenberg |
| 2006/0265518 A1 | 11/2006 | Owens et al. |
| 2006/0281058 A1 | 12/2006 | Mangoaela |
| 2006/0282797 A1 | 12/2006 | Barsness et al. |
| 2007/0005616 A1* | 1/2007 | Hay et al. ................. 707/100 |
| 2007/0014404 A1 | 1/2007 | Cha |
| 2007/0025704 A1 | 2/2007 | Tsukazaki et al. |
| 2007/0039023 A1 | 2/2007 | Kataoka |
| 2007/0050346 A1 | 3/2007 | Goel et al. |
| 2007/0055926 A1 | 3/2007 | Christiansen et al. |
| 2007/0061335 A1 | 3/2007 | Ramer et al. |
| 2007/0073596 A1 | 3/2007 | Alexander et al. |
| 2007/0078273 A1 | 4/2007 | Hirota |
| 2007/0079383 A1 | 4/2007 | Gopalakrishnan |

(56) References Cited

U.S. PATENT DOCUMENTS

| | | |
|---|---|---|
| 2007/0094285 A1 | 4/2007 | Agichtein et al. |
| 2007/0094351 A1 | 4/2007 | Kalish et al. |
| 2007/0105536 A1 | 5/2007 | Tingo |
| 2007/0112817 A1 | 5/2007 | Danninger |
| 2007/0118533 A1 | 5/2007 | Ramer et al. |
| 2007/0130109 A1 | 6/2007 | King et al. |
| 2007/0136660 A1 | 6/2007 | Gurcan et al. |
| 2007/0136679 A1 | 6/2007 | Yang |
| 2007/0142934 A1 | 6/2007 | Boercsoek et al. |
| 2007/0150456 A1 | 6/2007 | Lian et al. |
| 2007/0174545 A1 | 7/2007 | Okada et al. |
| 2007/0185865 A1 | 8/2007 | Budzik et al. |
| 2007/0189719 A1 | 8/2007 | Furumachi et al. |
| 2007/0219983 A1 | 9/2007 | Fish |
| 2007/0233562 A1 | 10/2007 | Lidwell et al. |
| 2007/0233692 A1 | 10/2007 | Lisa et al. |
| 2007/0234209 A1 | 10/2007 | Williams |
| 2007/0238077 A1 | 10/2007 | Strachar |
| 2007/0240187 A1 | 10/2007 | Beach et al. |
| 2007/0250573 A1 | 10/2007 | Rothschild |
| 2007/0282809 A1 | 12/2007 | Hoeber et al. |
| 2007/0283173 A1 | 12/2007 | Webb et al. |
| 2007/0288853 A1 | 12/2007 | Neil |
| 2008/0005097 A1 | 1/2008 | Kleewein et al. |
| 2008/0005203 A1 | 1/2008 | Bots et al. |
| 2008/0005664 A1 | 1/2008 | Chandra |
| 2008/0016164 A1 | 1/2008 | Chandra |
| 2008/0027933 A1 | 1/2008 | Hussam |
| 2008/0031595 A1 | 2/2008 | Cho |
| 2008/0040233 A1 | 2/2008 | Wildman et al. |
| 2008/0082518 A1 | 4/2008 | Loftesness |
| 2008/0082911 A1 | 4/2008 | Sorotokin et al. |
| 2008/0089665 A1 | 4/2008 | Thambiratnam et al. |
| 2008/0113614 A1 | 5/2008 | Rosenblatt |
| 2008/0115224 A1 | 5/2008 | Jogand-Coulomb et al. |
| 2008/0120280 A1 | 5/2008 | Iijima et al. |
| 2008/0133479 A1 | 6/2008 | Zelevinsky et al. |
| 2008/0154908 A1 | 6/2008 | Datar et al. |
| 2008/0163039 A1 | 7/2008 | Ryan et al. |
| 2008/0164304 A1 | 7/2008 | Narasimhan et al. |
| 2008/0165141 A1* | 7/2008 | Christie ............... 345/173 |
| 2008/0168073 A1 | 7/2008 | Siegel et al. |
| 2008/0208833 A1 | 8/2008 | Basmov |
| 2008/0222552 A1 | 9/2008 | Batarseh et al. |
| 2008/0235351 A1 | 9/2008 | Banga et al. |
| 2008/0243788 A1 | 10/2008 | Reztlaff et al. |
| 2008/0243828 A1 | 10/2008 | Reztlaff et al. |
| 2008/0259057 A1 | 10/2008 | Brons |
| 2008/0293450 A1 | 11/2008 | Ryan et al. |
| 2008/0294674 A1 | 11/2008 | Reztlaff, II et al. |
| 2008/0295039 A1 | 11/2008 | Nguyen et al. |
| 2008/0301820 A1 | 12/2008 | Stevens |
| 2009/0094528 A1 | 4/2009 | Gray et al. |
| 2009/0094540 A1 | 4/2009 | Gray et al. |
| 2009/0181649 A1 | 7/2009 | Bull et al. |
| 2009/0228774 A1 | 9/2009 | Matheny et al. |
| 2009/0241054 A1 | 9/2009 | Hendricks |
| 2009/0263777 A1 | 10/2009 | Kohn |
| 2009/0319482 A1 | 12/2009 | Norlander et al. |
| 2010/0023259 A1 | 1/2010 | Krumm et al. |
| 2010/0081120 A1 | 4/2010 | Nanjiani et al. |
| 2010/0125876 A1 | 5/2010 | Craner et al. |
| 2010/0131385 A1 | 5/2010 | Harrang et al. |
| 2010/0188327 A1 | 7/2010 | Frid et al. |
| 2011/0050591 A1* | 3/2011 | Kim et al. ............ 345/173 |
| 2011/0112671 A1* | 5/2011 | Weinstein ............. 700/94 |
| 2011/0191710 A1* | 8/2011 | Jang et al. ............ 715/776 |
| 2011/0295926 A1 | 12/2011 | Battiston et al. |
| 2012/0016774 A1* | 1/2012 | Dicke et al. ............ 705/27.1 |
| 2012/0036431 A1 | 2/2012 | Ito et al. |
| 2012/0041941 A1 | 2/2012 | King et al. |
| 2013/0246157 A1 | 9/2013 | Puppin et al. |

FOREIGN PATENT DOCUMENTS

| | | |
|---|---|---|
| CN | 101120358 | 2/2008 |
| JP | 6274493 A | 9/1994 |
| JP | 07078139 | 3/1995 |
| JP | 09179870 | 7/1997 |
| JP | 10091640 | 4/1998 |
| JP | 11074882 | 3/1999 |
| JP | 2000501214 | 2/2000 |
| JP | 2001052016 | 2/2001 |
| JP | 2001052025 | 2/2001 |
| JP | 2001100702 A | 4/2001 |
| JP | 2001195412 | 7/2001 |
| JP | 2001236358 | 8/2001 |
| JP | 2002099739 A | 4/2002 |
| JP | 2002197079 A | 7/2002 |
| JP | 2002259718 | 9/2002 |
| JP | 2002536736 | 10/2002 |
| JP | 2003016104 | 1/2003 |
| JP | 2003122969 | 4/2003 |
| JP | 2003513384 | 4/2003 |
| JP | 2003516585 | 5/2003 |
| JP | 2003517158 | 5/2003 |
| JP | 2003186910 | 7/2003 |
| JP | 2005056041 | 3/2005 |
| JP | 2006011694 | 1/2006 |
| JP | 2006107496 | 4/2006 |
| JP | 2006129323 | 5/2006 |
| JP | 2006190114 | 7/2006 |
| JP | 2008071334 | 3/2008 |
| JP | 2008516297 | 5/2008 |
| JP | 2008527580 | 7/2008 |
| JP | 2008197634 | 8/2008 |
| WO | WO97/20274 | 6/1997 |
| WO | WO9720274 | 6/1997 |
| WO | WO00/45588 | 8/2000 |
| WO | WO0045588 | 8/2000 |
| WO | WO0075840 A2 | 12/2000 |
| WO | WO01/42978 | 6/2001 |
| WO | WO0239206 | 5/2002 |
| WO | WO02039206 | 5/2002 |
| WO | WO2004055647 A2 | 7/2004 |
| WO | WO2006078728 A2 | 7/2006 |

OTHER PUBLICATIONS

About goodreads; 2006; Goodreads.com; pp. 1-2.*
Canadian Office Action mailed Jul. 6, 2012 for Canadian patent application No. 2594573, a counterpart foreign application of US patent application No. 8,131,647, 5 pages.
The Chinese Office Action mailed May 17, 2012 for Chinese patent application No. 20078004873.9, a counterpart foreign application of US patent No. 7,865,817, 5 pages.
The Chinese Office Action mailed May 21, 2012 for Chinese patent application No. 200880017589.9, a counterpart foreign application of U.S. Appl. No. 11/763,369, 9 pages.
Final Office Action from the U.S. Patent and Trademark Office for U.S. Appl. No. 11/763,378, mailed on Mar. 16, 2010, 16 pgs.
Office Action from the U.S. Patent and Trademark Office for U.S. Appl. No. 11/763,375, mailed on Jan. 19, 2010, 31 pgs.
Office Action from the U.S. Patent and Trademark Office for U.S. Appl. No. 11/763,378, mailed on Oct. 15, 2009, 31 pgs.
Office Action from the U.S. Patent and Trademark Office for Application U.S. Appl. No. 11/763,375, mailed on Aug. 6, 2010, 17 pgs.
Office action for U.S. Appl. No. 11/693,682, mailed on Apr. 23, 2012, Siegel et al., "Providing Annotations of a Digital Work", 12 pages.
Final Office Action for U.S. Appl. No. 11/763,386, mailed on Apr. 26, 2012, Thomas Ryan et al., "Handling of Subscription-Related Issues in a Media Consumption System", 14 pages.
Non-Final Office Action for U.S. Appl. No. 13/083,445, mailed on May 4, 2012, Hilliard B. Siegel et al., "Method and System for Providing Annotations of a Digital Work", 20 pages.
Final Office Action for U.S. Appl. No. 11/763,395, mailed May 9, 2012, Thomas Ryan et al., "Providing Supplemental Information Based on Hints in a Media Consumption System", 12 pages.
Office action for U.S. Appl. No. 11/763,390, mailed on Jun. 27, 2012, Bajaj et al., "Providing User-Supplied Items to a User Device", 7 pages.

(56) References Cited

OTHER PUBLICATIONS

Office action for U.S. Appl. No. 11/763,392, mailed on Jun. 27, 2012, Ryan et al., "Administrative Tasks in a Media Consumption System", 47 pages.

Non-Final Office Action for U.S. Appl. No. 12/943,211, mailed on Jun. 6, 2012, James. R. Retzlaff II et al., "Obtaining and Verifying Search Indices", 10 pages.

Non-Final Office Action for U.S. Appl. No. 11/763,369 mailed on Jun. 7, 2012, James R. Reztlaff II et al., "Search of Multiple Content Sources on a User Device", 20 pages.

Card et al., "3Book: A 3D Electronic Smart Book", AVI'04 May 25-28, 2004, Hallipoli, Italy, ACM 2004, pp. 309-pp. 307.

The Japanese Office Action mailed Oct. 25, 2011 for Japanese patent application No. 2007-552235, a counterpart foreign application of U.S. Appl. No. 11/039,645, 3 pages.

Mercier et al., "Sphere of influence Model in Information retrieval", IEEE 2005 International Conference on Fuzzy Systems, pp. 120-pp. 125.

Final Office Action for U.S. Appl. No. 11/537,484, mailed on Jan. 24, 2012, Thomas A. Ryan, "Expedited Acquisition of a Digital Item Following a Sample Presentation of the Item", 22 pages.

Final Office Action for U.S. Appl. No. 12/414,914, mailed on Jan. 4, 2012, Agarwal et al., "Questions on Highlighted Passages", 41 pages.

Final Office Action for U.S. Appl. No. 12/759,828, mailed on Nov. 10, 2011, James R. Retzalff II, "Search and Indexing on a User Device", 16 pages.

Final Office Action for U.S. Appl. No. 11/537,518, mailed on Nov. 25, 2011, John Lattyak, "Acquisition of an Item Based on a Catalog Presentation of Items," 8 pages.

Office action for U.S. Appl. No. 11/763,357, mailed on Dec. 21, 2011, Reztlaff et al., "Obtaining and Verifying Search Indices", 14 pages.

Final Office Action for U.S. Appl. No. 11/763,363, mailed on Dec. 23, 2011, James R. Rezlaff II et al., "Search Results Generation and Sorting", 10 pages.

Non-Final Office Action for U.S. Appl. No. 11/763,369, mailed on Dec. 29, 2011, James R. Reztlaff II et al., "Search of Multiple Content Sources on a User Device", 21 pages.

Final Office Action for U.S. Appl. No. 11/693,685, dated Dec. 8, 2011, John Lattyak et al., "Relative Progress and Event Indicators", 23 pages.

Final Office Action for U.S. Appl. No. 11/763,374, mailed on Feb. 13, 2012, Thomas Ryan et al., "Consumption of Items via a User Device", 14 pages.

Non-Final Office Action for U.S. Appl. No. 11/763,393, mailed on Feb. 16, 2012, John Lattyak et al., "Incremental Updates of Items", 24 pages.

Final; Office Action for U.S. Appl. No. 12/360,089, mailed on Mar. 28, 2012, Tom Killalea et al., "Aggregation of Highlights", 17 pages.

Non-Final Office Action for U.S. Appl. No. 12/366,941, mailed on Mar. 30, 2012, Scott Dixon et al., "Bundled Digital Content", 12 pages.

U.S. Appl. No. 11/763,339, filed Jun. 14, 2007, David Isbister; Marshall Willilams; Nicholas Vaccaro, "Power Management Techniques for a User Device."

U.S. Appl. No. 11/763,363, filed Jun. 14, 2007, James Rezlett II; Thomas Ryan, "Search Results Generation and Sorting."

U.S. Appl. No. 12/351,663, filed Jan. 9, 2009, Chris Li; Steven Chase, "Surface Mount Clip for Routing and Grounding Cables."

U.S. Appl. No. 12/360,744, filed Jan. 27, 2009, Rajiv Kotesh Ghanta; Marcos Frid; Joseph J. Hebenstreit; John T. Kim, "Electric Device With Haptic Feedback."

Beigbeder et al., "An Information Retrieval Model the Fuzzy Proximity Degree of Term Occurences", 2005 ACM Symposium on Applied Computing, pp. 1018-pp. 1022.

Roscheisen, M., et al., "Beyond Browsing: Shared Comments, SOAPs, Trails, and On-Line Communities," Computer Networks and ISDN Systems 27:739-749, 1995.

Bradley, "Plastic Shape Shifter", retrieved on May 7, 2009 at <<http://www.reactivereports.com/61/61_3.html>>, Chemistry WebMagazine, Issue No. 61, Dec. 2006, 2 pgs.

Breu, M. et al., "The Medoc Distrubuted Electronic Library: Accouting and Security Aspects", Electronic Publishing New Models and Opportunities, Proceedings of an ICCC/IFIP Conference, Apr. 14, 1997, pp. 237-249.

Cavanaugh "EBooks and Accommodations", Teaching Expectional Children vol. 35 No. 2, p. 56-61 Copyright 2002 CEC Cavanaugh, "EBooks and Accommodations", Teaching Exceptional Children, vol. 35, No. 2, Copyright 2002 CEC, 6 pages.

Cleveland, Jr. et al., "Questions and Answers about Biological Effects and Potentional Hazards of Radiofrequency Electromagnetic Fields" OET Bulletin 56, Fourth Edition, Aug. 1999, 38 pages.

Cleveland, Jr., et al, "Evaluating Compliance with FCC Guidelines for Human Exposure to Radiofrequency Electromagnetic Fields", OET Bulletin 65, Edition 97-01, Aug. 1997, 84 pages.

The Chinese Office Action mailed Oct. 10, 2011 for Chinese patent application No. 200880017259.X, a counterpart foreign application of U.S. Appl. No. 11/693,682, 7 pages.

Chinese Office Action mailed Aug. 25, 2011 for Chinese patent application No. 200880024964.2, a counterpart foreign application of U.S. Appl. No. 11/763,358, 6 pages.

The Chinese Office Action mailed Sep. 26, 2011 for Chinese patent application No. 200880017589.9, a counterpart foreign application of U.S. Appl. No. 11/763,369, 9 pages.

The Chinese Office Action mailed Sep. 30, 2011 for Chinese patent application No. 200880025056.5, a counterpart foreign application of U.S. Appl. No. 11/763,374, 9 pages.

Desmoulins et al., "Pattern-Based Annotations on E-books: From Personal to Shared Didactic Content", Proceedings of the IEEE International Workshop on Wireless adn Mobile Techniques in Education, 2002, 4 pages.

Carter, S., et al., "Digital Graffiti: Public Annotation of Multimedia Content," Proceedings o/the CHI2004, Vienna, Austria, Apr. 24-29, 2004, pp. 1207-1210.

Elspass, et al., "Portable Haptic Interface with Active Functional Design", In Proceedings SPIE Conference on Smart Structures and Integrated Systems, Newport Beach, California, vol. 3668, Mar. 1999, 926-932.

Office Action from the U.S. Patent and Trademark Office for U.S. Appl. No. 11/763,375, mailed Feb. 23, 2010, 15 pages.

Gladney, H. M.: "Access Control for Large Collections", NY, vol. 15, No. 2, Apr. 1, 1997, pp. 154-194.

"Haptic History—Machine Haptics (Expansion)" retrieved on May 7, 2009 at <<http://hapticshistory.chc61.uci.cu/haptic/site/pages/Machine-Haptics-Became_5.php.>> from Google's cache, text-only version as webpage appeared on Apr. 16, 2009, 8 pgs.

Henke, H. "Survey on Electronic Book Features", Open eBook Forum, online, Mar. 20, 2002, pp. 1-14, retrieved from the Internet: <http://www.openebook.org/doc_library/surveys/IDPF_eBook_Features_2002.pdf> retrieved Nov. 8, 2010.

Jones, et al., "Development of a Tactile Vest", IEEE Computer Society, In the Proceedings of the 12th International Symposium on Haptic Interfaces for Virtual Environment and Teleoperator Systems, Mar. 27-28, 2004, pp. 82-89.

Leach et al, "A Universally Unique IDentifier (UUID) URN Namespace", Jul. 2005, IETF, retrieved on Apr. 21, 2010 at http://tools.ietf.org/pdf/rfc4122.pdf, 32 pgs.

Leutwyler, "Shape-shifting Polymer Gels", retrieved on May 7, 2009 at <<http://www.scientificamerican.com/article.cfm?id=shape-shifting-polymer-ge&print=true>>, Scientific American, Nov. 9, 2000, 1 pg.

Means, et al., "Evaluating Compliance with FCC Guidelines for Human Exposure to Radiofrequency Electromagnetic Fields" OET Bulletin 65 Edition 97-01, Jun. 2001, 57 pages.

Nakatani, et al., "3D Form Display with Shape Memory Alloy", In Proceedings of 13th International Conference on Artificial Reality and Teleexistence (ICAT), 2003, pp. 179-184.

Navarro, et al., "Modern Information Retrieval, Chapter 8: Indexing and Searching", Jan. 1, 1999, Modern Information Retrieval, ACM Press, New York, pp. 191-228.

(56) References Cited

OTHER PUBLICATIONS

Final Office Action for U.S. Appl. No. 11/763,392, mailed on Oct. 14, 2011, Thomas Ryan, "Administrative Tasks in a Media Consumption System", 38 pages.
Office action for U.S. Appl. No. 11/763,390, mailed on Oct. 24, 2011, Bajaj et al., "Providing User-Supplied Items to a User Device", 11 pages.
Non-Final Office Action for U.S. Appl. No. 11/763,386, mailed on Nov. 8, 2011, Thomas Ryan, "Handling of Subscription-Related Issues in a Media Consumption System", 10 pages.
Non-Final Office Action for U.S. Appl. No. 11/763,395, Thomas Ryan, "Providing Supplemental Information Based on Hints in a Media Consumption System", 10 pages.
Office action for U.S. Appl. No. 12/333,215, mailed on Jul. 18, 2011, Zagorie et al., "Device-Specific Presentation Control for Electronic Book Reader Devices", 22 pages.
Office action for U.S. Appl. No. 12/414,914, mailed on Aug. 4, 2011, Agarwal et al., "Questions on Highlighted Passages", 39 pages.
Non-final Office Action for U.S. Appl. No. 11/537,484, mailed on Aug. 19, 2011, Thomas A. Ryan, "Expedited Acquisition of a Digital Item Following a Sample Presentation of the Item", 13 pages.
Non-final Office Action for U.S. Appl. No. 11/763,363, mailed on Aug. 26, 2011, James R. Rezlaff II, "Search Results Generation and Sorting", 10 pages.
Non-Final Office Action for U.S. Appl. No. 11/763,358, mailed on Sep. 12, 2011, James R. Retzlaff II, "Managing Status of Search Index Generation", 11 pages.
Final Office Action for U.S. Appl. No. 11/963,618, mailed on Sep. 26, 2011, Michael Rykov, "Dissemination of Periodical Samples", 15 pages.
Non-Final Office Action for U.S. Appl. No. 11/763,374, mailed on Sep. 27, 2011, Thomas Ryan, "Consumption of Items via a User Device", 17 pages.
International Search Report mailed Sep. 9, 2008, in International Application No. PCT/US/08/64387, filed May 21, 2008, 1 page.
International Search Report mailed Aug. 15, 2008, in International Application No. PCT/US07/89105, filed Dec. 28, 2007, 2 pages.
International Search Report mailed Aug. 15, 2008, in corresponding International Application No. PCT/US08/57829, filed Mar. 21, 2008, 1 page.
"Shape Memory Polymer", retrieved on May 7, 2009 at <<http://en.wikipedia.org/wiki/Shape_Memory_Polymer>>, Wikipedia, 8 pgs.
Marshall, C.C., "The Future of Annotation in a Digital (Paper) World," Proceedings o/the 35th Annual GSLIS Clinic, University of Illinois at UrbanaChampaign, Urbana, 11, Mar. 22-24, 1998, pp. 1-19.
Wellman, et al., "Mechanical Design and Control of a High-Bandwidth Shape Memory Alloy Tactile Display", Springer-Verlag, In the Proceedings of the International Symposium on Experimental Robotics, Barcelona, Spain, Jun. 1997, pp. 56-66, 12 pgs.
Ziviani, N ED, Baeza-Yates R. et at: "Modern Information Retrieval, Text Operations", Jan. 1, 1999, Modern Information Retrieval, ACM Press, NY, pp. 163-190.
Zobel, J. et al., "Inverted Files for Text Search Engines" ACM Computing Surveys, vol. 38, No. 2, Jul. 1, 2006, pp. 1-56, NY, NY.
The Chinese Office Action mailed Aug. 3, 2012 for Chinese patent application No. 200880025056.5, a counterpart foreign application of U.S. Appl. No. 11/763,374, 17 pages.
Office action for U.S. Appl. No. 13/083,445, mailed on Oct. 5, 2012, Siegel et al., "Method and System for Providing Annotations of a Digital Work", 29 pages.
The Chinese Office Action mailed Dec. 13, 2012 for Chinese patent application No. 20078004873.9, a counterpart foreign application of US patent No. 7,865,817, 4 pages.
The Chinese Office Action mailed Dec. 14, 2012 for Chinese patent application No. 200880017589.9, a counterpart foreign application of U.S. Appl. No. 11/763,369, 18 pages.
The Chinese Office Aciton mailed Feb. 1, 2013 for Chinese patent application No. 200880025056.5, a counterpart foreign application of U.S. Appl. No. 11/763,374, 19 pages.
The Japanese Office Action mailed Dec. 17, 2012 for Japanese patent application No. 2010-509529, a counterpart foreign application of U.S. Appl. No. 11/763,374, 7 pages.
The Japanese Office Action mailed Dec. 7, 2012 for Japanese patent application No. 2010-501124, a counterpart foreign application of U.S. Appl. No. 11/693,682, 6 pages.
Office action for U.S. Appl. No. 12/943,211, mailed on Feb. 6, 2013 Reztlaff, II et al., "Obtaining and Verifying Search Indices", 9 pages.
Office action for U.S. Appl. No. 11/763,392, mailed on Feb. 14, 2013, Ryan et al., "Administrative Tasks in a Media Consumption System", 46 Pages.
US Pat. Pub. No. 2004081300 dated Apr. 29, 2004, corresponding to Japanese Patent Application Laid-open No. 2002-259718, 14 pages.
"A Universal Unique IDentifier (UUID) URN Namespace", Jul. 2005, IETF, all pages. Retrieved on Apr. 21, 2010 at http://tools.ietf.org/pdf/rfc4122.pdf 32 pages.
"Annotator Instructions," Berkman Center for Internet & Society at Harvard Law School <<http://cyber.law.harvard.edu/annotate/instructions.html>>, also found at <<http://cyber.law.harvard.edu/cite/instructions.html>>, [Retrieved Jan. 30, 2004]. 1 page.
"Annotator Wishlist," Berkman Center for Internet & Society at Harvard Law School r <http://cyber.law.harvard.edulcite/annotate.cgi?action=print&markup ;center=; view=http%3A%2F%2Fcy . . . >[Retrieved Jan. 30, 2004]. 1 page.
BarnesandNoble.com, "Barnes and Noble Homepage", retrieved on Aug. 21, 2011 http://web.archive.org/web/19981202183957/http://www.barnesandnoble.com/, Dec. 2, 1998, 2 pages.
Bellwood, et al., "UDDI Version 2.04 API Specification UDDI Committee Specification, Jul. 19, 2002", Oasis, all pages. Retrieved on Apr. 21, 2010 via Wayback Machine at http://web.archive.org/web/20050314033213/www.oasis-open.org/committees/uddi-spec/doc/tcspecs.htm, 95 pages.
Biskup, J., et al, "Towards a Credential-Based Implementation of Compound Access Control Policies" SACMAT '04, Proceedings of the ninth ACM symposium on Access control models and technologies, Jun. 4, 2004, NY, retrieved from the internet: http://portal.acm.org/citation.cfm?id=990036.990042 (retrieved Nov. 9, 2010, 10 pages.
Canadian Office Action mailed Apr. 14, 2009 for Canadian Patent Application No. 2594573, a counterpart foreign application of U.S. Appl. No. 11/039,645, 3 pages.
Cafesoft.com, "Security Glossary", dated Oct. 13, 2003, retrieved from the Wayback Machine on Jul. 2, 2009 at <<http://web.archive.org/web/20031013022218/http://cafesoft.com/support/security-glossary.html>> 6 pages.
Chi et al. "eBooks with Indexes that Reorganize Conceptually", CHI2004, Apr. 24-29, 2004, Vienna, Austria ACM 1-58113-703-6/04/0004, 4 pages.
The Chinese Office Action mailed May 9, 2008 for Chinese Patent Application No. 200680002606.2, a counterpart foreign application of U.S. Appl. No. 11/039,645, 22 pages.
The Chinese Second Office Action mailed Jun. 5, 2009 for Chinese Patent Application No. 200680002606.2, a counterpart foreign application of U.S. Appl. No. 11/039,645, 20 pages.
The Chinese Third Office Action mailed Nov. 27, 2009 for Chinese Patent Application No. 200680002606.2, a counterpart foreign application of U.S. Appl. No. 11/039,645, 15 pages.
The Chinese Office Action mailed Jul. 14, 2011 for Japanese patent application No. 20078004873.9, a counterpart foreign application of US patent No. 7,865,817, 10 pages.
Davison et al. "The Use of eBooks and Interactive Multimedia, as Alternative Forms of Technical Documentation" SIGDOC'05, Sep. 21-23, 2005, Conventry, United Kingdom, Copyright 2005 ACM 1-59593-175-09/5/0009, 8 pages.
Extended European Search Report mailed Dec. 22, 2009, issued in corresponding European Patent Application No. EP 06 71 8773.2, filed Jan. 18, 2006, 9 pages.
The European Office Action mailed Dec. 12, 2009 for European Patent Application No. 06718773.2, a counterpart foreign application of U.S. Appl. No. 11/039,645, 9 pages.
The European Search report mailed Dec. 22, 2009 for European Patent Application No. 06718773.2, a counterpart foreign application of U.S. Appl. No. 11/039,645, 9 pages.

(56) References Cited

OTHER PUBLICATIONS

Final Office Action for U.S. Appl. No. 11/763,358, mailed on Apr. 5, 2011, James R. Retzlaff II, "Managing Status of Search Index Generation" 21 pages.
The Japanese Office Action mailed Jan. 25, 2011 for Japanese Patent Application No. 2007-552235, a counterpart foreign application of U.S. Appl. No. 11/039,645, 6 pages.
The Japanese Office Action mailed Apr. 12, 2013 for Japanese patent application No. 2010-501125, a counterpart foreign application of U.S. Appl. No. 11/763,369, 5 pages.
Office action for U.S. Appl. No. 12/360,089, mailed on Oct. 5, 2011, Killalea et al., "Aggregation of Highlights", 17 pages.
Office action for U.S. Appl. No. 11/763,386, mailed on Feb. 28, 2013, Ryan et al., "Handling of Subscription-Related Issues in a Media Consumption System", 17 pages.
Office action for U.S. Appl. No. 12/360,089, mailed on Mar. 5, 2013, Killalea et al., "Aggregation of Highlights", 17 pages.
Office action for U.S. Appl. No. 11/763,374, mailed on Apr. 22, 2013, Ryan et al., "Consumption of Items via a User Device", 17 pages.
Non-Final Office Action for U.S. Appl. No. 11/537,518, mailed on Apr. 28, 2011, John Lattyak, "Acquisition of an Item Based on a Catalog Presentation of Items" 8 pages.
Office action for U.S. Appl. No. 11/763,390, mailed on Apr. 8, 2013, Bajaj et al, "Providing User-Supplied Items to a User Device", 7 pages.
Office action for U.S. Appl. No. 11/763,369, mailed on May 14, 2013, Reztlaff, II et al., "Search of Multiple Content Sources on a User Device", 24 pages.
Office action for U.S. Appl. No. 11/763,395, mailed on May 2, 2013,Ryan et al., "Providing Supplemental Information Based on Hints in a Media Consumption System", 12 pages.
Office action for U.S. Appl. No. 11/763,357, mailed on May 26, 2011, Reztlaff, "Obtaining and Verifying Search Indices" 13 pages.
Final Office Action for U.S. Appl. No. 11/763,314, mailed on Jun. 13, 2011, Craig S. Griffin, "Display Dependent Markup Language" 26 pages.
Non-Final Office Action for U.S. Appl. No. 11/693,682, mailed on Jun. 9, 2011, Hilliard B. Siegel, "Providing Annotations of a Digital Work" 12 pages.
Non-Final Office Action for U.S. Appl. No. 11/693,685, John Lattyak, "Relative Progress and Event Indicators" dated Jul. 6, 2011, 22 pages.
Oki et al., "The Infomation Bus-An Architecture for Extensive Distributed Systems", ACM, 1993, 11 pages.
OQO "A Full PC That Fits in Your Pocket" Retrieved on Sep. 22, 2008 at <<http://www.oqo.com/support/documentation.html>> 34 pages.
"Say No to Third Voice," Worldzone.net, 1999-2004, <http://worldzone.netiinternetipixelsnttv/index.html> [retrieved Jan. 30, 2004], 5 pages.
Sohn et al. "Development of a Standard Format for eBooks", SAC2002, Madrid, Spain, 2002, ACM 1-58113-445-2/02/0, 6 pages.
"The Berkman Center for Internet & Society at Harvard Law School: Annotation Engine," Harvard.Edu, 1999-2004, <http://cyber.iaw.harvard.eduJprojects/annotate.html> [Retrieved Jan. 30, 2004], 3 pages.
Kumar, A., "Third Voice Trails off . . . ," Wired News, 2004, <http://www.wired.comlnews/printIO. 1294,42803 ,00.html> [retrieved Jan. 30, 2004], 3 pages.
"Universal Unique Identifier", dated Dec. 16, 2002. The Open Group, all pages. Retrieved on Apr. 21, 2010 via Wayback Machine at http://web.archive.org/web/20021216070918/http://www.opengroup.org/onlinepubs/9629399/apdxa.htm, 9 pages.
"Web Services Architecture: W3C Working Group Note Feb. 11, 2004", W3C, all pages. Retrieved on Apr. 21, 2010 via Wayback Machine at http://web.archive.org/web/2004040205185/http://www.w3.org/TR/ws-arch/, 100 pages.
Yoshikawa, et al., "Vertical Drive Micro Actuator for Haptic Display Using Shape Memory Alloy Thin Film", IEE Japan, Papers of Technical Meeting on Micromachine and Sensor System, Journal Code L2898B, vol. MSS-05, No. 21-44, 2005, 1 page.

The Chinese Office Action mailed Sep. 24, 2012 for Chinese patent application No. 200880017259.X, a counterpart foreign application of U.S. Appl. No. 11/693,682, 5 pages.
The Japanese Office mailed Oct. 12, 2012 for Japanese patent application No. 2009-544304, a counterpart foreign application of US patent No. 7,865,817, 6 pages.
The Japanese Office Action mailed Sep. 18, 2012 for Japanese patent application No. 2007-552235, a counterpart foreign application of US patent No. 8,131,647, 4 pages.
Office action for U.S. Appl. No. 11/763,374 mailed on Oct. 16, 2012, Ryan et al, "Consumption of Items via a User Device", 13 pages.
Office action for U.S. Appl. No. 12/360,089, mailed on Nov. 23, 2012, Killalea et al., "Aggregation of Highlights", 15 pages.
U.S. Appl. No. 11/277,894, filed Mar. 29, 2006, Jateen P. Parekh, Gregg E. Zehr, and Subram Narasimhan,"Reader Device Content Indexing" 42 pages.
U.S. Appl. No. 11/537,484, filed Sep. 29, 2006, Thomas Ryan, "Expedited Acquisition of a Digital Item Following a Sample Presentation of the Item." 60 pages.
U.S. Appl. No. 11/537,518, filed Sep. 29, 2006, John Lattyak, "Acquisition of an Item based on a Catalog Presentation of Items." 56 pages.
U.S. Appl. No. 11/693,685, filed Mar. 29, 2007, John Lattyak; John Kim; Steven Moy; Laurent an Minh Nguyen, "Relative Progress and Event Indicators." 44 pages.
U.S. Appl. No. 11/763,314, filed Jun. 14, 2007, John Lattyak; Craig Griffin; Steven Weiss, "Display Dependent Markup Language." 39 pages.
U.S. Appl. No. 11/763,357, filed Jun. 14, 2007, James Reztlaff II; John Lattyak, "Obtaining and Verifying Search Indices." 180 pages.
U.S. Appl. No. 11/763,375, filed Jun. 14, 2007, John Lattyak, Girish Bansil Bajaj, Kevin R. Cheung, Thomas Fruchterman, Robert L. Goodwin, Kenneth P. Kiraly, Richard Moore, Subram Narasimhan, Thomas A. Ryan, Michael V. Rykov, Jon Saxton, James C. Slezak, Beryl Tomay, Aviram Zagorie, Gregg Elliott Zehr, "Delivery of Items for Consumption by a User Device." 123 pages.
U.S. Appl. No. 11/763,376, filed Jun. 14, 2007, Kenneth Kiraly; Thomas Ryan; Gregg Zehr; John Lattyak; Michael Rykov; Girish Bansilal Bajaj; James Slezak; Aviram Zagorie; Richard Moore; Kevin Cheung; Thomas Fruchterman; Robert Goodwin, "Notification of a User Device to Perform an Action." 127 pages.
U.S. Appl. No. 11/763,378, filed Jun. 14, 2007, John Lattyak; Thomas Ryan; Gregg Zehr; Kenneth Kiraly; Michael Rykov; Girish Bansilal Bajaj; James Slezak; Aviram Zagorie; Richard Moore; Kevin Cheung; Thomas Fruchterman; Robert Goodwin; Xiaotian Guo, "Transfer of Instructions to a User Device." 125 pages.
U.S. Appl. No. 11/763,381 filed Jun. 14, 2007, Michael Rykov; Girish Bansilal Bajaj; James Slezak; Aviram Zagorie; Richard Moore; Kevin Cheung; Thomas Fruchterman; Robert Goodwin, "Selecting and Providing Items in a Media Consumption System." 127 pages.
U.S. Appl. No. 11/763,386, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin, "Handling of Subscription-Related Issues in a Media Consumption system." 121 pages.
U.S. Appl. No. 11/763,390, filed Jun. 14, 2007, Girish Bansilal Bajaj; Michael Rykov; James Slezak; Aviram Zagorie; Richard Moore; Kevin Cheung; Thomas Fruchterman; Robert Goodwin,, "Providing User-Supplied Items to a User Device." 123 pages.
U.S. Appl. No. 11/763,392, filed Jun. 14, 2007, Thomas Ryan; Gregg Zehr; Kenneth Kiraly; John Lattyak; Subram Narasimhan; Michael Rykov; Girish Bansilal Bajaj; James Slezak; Aviram Zagorie; Richard Moore; Kevin Cheung; Thomas Fruchterman; Robert Goodwin, "Administrative Tasks in a Media Consumption System ." 125 pages.
U.S. Appl. No. 11/763,393, filed Jun. 14, 2007, John Lattyak; Michael Rykov; Girish Bansilal Bajaj; James Slezak; Aviram Zagorie; Richard Moore; Kevin Cheung; Thomas Fruchterman; Robert Goodwin "Incremental Updates of Items ." 124 pages.
U.S. Appl. No. 11/763,395, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin

(56) References Cited

OTHER PUBLICATIONS

Cheung; Thomas Fruchterman; Robert Goodwin; James Reztlaff II, "Providing Supplemental Information Based on Hints in a Media Consumption System ." 123 pages.

U.S. Appl. No. 11/963,618, filed Dec. 21, 2007, Michael Rykov; Laurent an Minh Nguyen; Steven Moy, "Dissemination of Periodical Samples." 61 pages.

U.S. Appl. No. 12/333,215, filed Dec. 11, 2008, Aviram Zagorie; Craig Griffin; John Lattyak; Michael Rykov, "Device-Specific Presentation Control for Electronic Book Reader Devices." 38 pages.

U.S. Appl. No. 12/351,629, filed Jan. 9, 2009, John Johnston; Weiping Dou; Steven Chase, "Antenna Placement on Portable Device ." 15 pages.

U.S. Appl. No. 12/360,089, filed Jan. 26, 2009, Thomas Dimson, Janna Hamaker, Eugene Kalenkovich, Tom Killalea, "Aggregation of Highlights." 52 pages.

U.S. Appl. No. 12/366,941, filed Feb. 6, 2009, Scott Dixon; Eriel Thomas, "Bundled Digital Content." 35 pages.

U.S. Appl. No. 12/414,914, filed Mar. 31, 2009, Amit Agarwal; Zaur Kambarov; Tom Killalea, "Questions on Highlighted Passages." 49 pages.

U.S. Appl. No. 29/331,528, filed Jan. 27, 2009, Chris Green, "User Interface Cluster." 1 page.

The Chinese Office Action mailed Jun. 28, 2013 for Chinese patent application No. 20078004873.9, a counterpart foreign application of US patent application No. 7,865,817, 4 pages.

The Chinese Office Action mailed Jun. 6, 2013 for Chinese patent application No. 201080006308.7, a counterpart foreign application of US patent No. 8,378,979, 13 pages.

The Chinese Office Action mailed Jul. 10, 2013 for Chinese patent application No. 200880025056.5, a counterpart foreign U.S. Appl. No. 11/763,374, 8 pages.

The European Office Action mailed Mar. 26, 2010 for European Patent Application No. 06718773.2, a counterpart foreign application of U.S. Appl. No. 11/039,645, 1 page.

The European Office Action mailed Jun. 10, 2013 for European patent application No. 06718773.2, a counterpart foreign application of U.S. Appl. No. 11/693,682, 6 pages.

Final Office Action from the U.S. Patent and Trademark Office for Application U.S. Appl. No. 12/414,914, mailed on Jan. 4, 2012, 41 pgs.

The Japanese Office Action mailed May 24, 2013 for Japanese patent application No. 2010-501124, a counterpart foreign application of U.S. Appl. No. 11/693,682, 7 pages.

The Japanese Office Action mailed May 31, 2013 for Japanese patent application No. 2010-509529, a counterpart foreign application of U.S. Appl. No. 11/763,374, 5 pages.

Office action for U.S. Appl. No. 12/759,828, mailed on Jun. 6, 2013, Reztlaff, II et al., "Search and Indexing on a User Device", 27 pages.

Office action for U.S. Appl. No. 12/360,089, mailed on Jul. 3, 2013, Killalea et al., "Aggregation of Highlights", 14 pages.

Office action for U.S. Appl. No. 11/763,376, mailed on Aug. 19, 2013, Kiraly et al., "Notification of a User Device to Perform an Action", 16 pages.

Office action for U.S. Appl. No. 11/537,484, mailed on Aug. 27, 2013, Ryan, "Expedited Acquisition of a Digital Item Following a Sample Presentation of the Item", 13 pages.

Office action for U.S. Appl. No. 11/693,685, mailed on Aug. 15, 2013, Lattyak et al., "Relative Progress and Event Indicators", 24 pages.

The Chinese Office Action mailed Nov. 5, 2013 for Chinese patent application No. 200880025056.5, a counterpart foreign application of U.S. Appl. No. 11/763,374, 15 pages.

Final Office Action for U.S. Appl. No. 11/763,395, mailed on Oct. 30, 2013, Thomas A. Ryan, "Providing Supplemental Information Based on Hints in a Media Consumption System", 14 pages.

The Japanese Office Action mailed Nov. 12, 2013 for Japanese patent application No. 2010-501125, a counterpart foreign application of U.S. Appl. No. 11/763,369, 9 pages.

The Japanese Office Action mailed Aug. 23, 2013 for Japanese patent application No. 2009-544304, a counterpart foreign application of US patent No. 7,865,817, 4 pages.

"Mastering to Become a True Manager, Well-selected commands for an efficient event log management, Part 1," Windows Server World, vol. 9, No. 2, pp. 86-96, IDG Japan, Japan, Feb. 1, 2004.

Office action for U.S. Appl. No. 11/763,386, mailed on Oct. 16, 2013, Ryan et al., "Handling of Subscription-Related Issues in a Media Consumption System",18 pages.

Office Action for U.S. Appl. No. 12/943,211, mailed on Oct. 8, 2013, "Obtaining and Verifying Search Indices", 9 pages.

Office Action for U.S. Appl. No. 12/759,828, mailed on Dec. 17, 2013, James R. Retzlaff II, "Search and Indexing on a User Device", 25 pages.

Office action for U.S. Appl. No. 12/414,914, mailed on Sep. 13, 2013, Agarwal et al, "Questions on Highlighted Passages", 35 pages.

Final Office Action for U.S. Appl. No. 11/763,369, mailed on Sep. 16, 2013, James R. Reztlaff II et al., "Search of Multiple Content Sources on a User Device", 23 pages.

Office action for U.S. Appl. No. 13/722,961, mailed on Sep. 5, 2013, Lattyak et al., "Delivery of Items for Consumption by a User Device", 6 pages.

The Chinese Office Action mailed Jan. 6, 2014 for Chinese patent application No. 201080006308.7, a counterpart foreign application of US patent No. 8,378,979, 12 pages.

Final Office Action for U.S. Appl. No. 12/360,089, mailed on Jan. 28, 2014, Tom Killalea, "Aggregation of Highlights", 14 pages.

Final Office Action for U.S. Appl. No. 12/414,914, mailed on Feb. 10, 2014, Amit D. Agarwal, "Questions on Highlighted Passages", 40 pages.

Translated copy of the Japanese Office Action mailed Jan. 14, 2014 for Japanese patent application No. 2011-548210, a counterpart foreign application of US patent No. 8,378,979, 4 pages.

Office Action for U.S. Appl. No. 11/537,518, mailed on Feb. 14, 2014, John Lattyak, "Acquisition of an Item Based on a Catalog Presentation of Items", 14 pages.

"Trilogy Definition", Merriam-Webster's Collegiate Dictionary, Tenth Edition, 1999, 2 pages.

Office Action for U.S. Appl. No. 11/763,374, mailed on Dec. 24, 2013, Thomas A. Ryan, "Consumption of Items via a User Device", 16 pages.

\* cited by examiner

PROGRESS INDICATION FOR A DIGITAL WORK

CROSS REFERENCE TO RELATED APPLICATIONS

This application is a continuation of and claims the benefit of U.S. patent application Ser. No. 11/693,685, filed on Mar. 29, 2007, the entire contents of which are incorporated herein by reference.

BACKGROUND

Electronic distribution of information has gained importance with the proliferation of personal computers and wide area networks such as the Internet. With the widespread use of the Internet, it has become possible to store and distribute large, coherent units of information, such as books, using electronic technologies. Books and other media in electronic format are commonly referred to as electronic books ("eBooks") or digital works.

Typically, digital works are structured as virtual frames presented on a computing device, and a user may turn or change from one virtual frame or "page" of electronic content to another. The term "page" as used herein refers to a collection of content presented at one time on a display. Thus, "pages" as described herein are not fixed permanently, and may be redefined or repaginated based on variances in display conditions, such as screen size, font type or size, margins, line spacing, resolution, or the like. Due in part to the variable nature of such "pages," users may find it difficult to gauge their progress through the digital work. This problem is compounded by the fact that digital works may be displayed and read on a variety of different computing devices (e.g., computer monitors, portable digital assistants (PDAs), pocket computers, specialized eBook reader devices, etc.), under a variety of different display conditions (e.g., screen size and resolution, font type and size, margins, line spacing, etc.).

Accordingly, there remains a need to improve a reader's ability to navigate within a digital work and to better identify his or her location within the content of the digital work.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
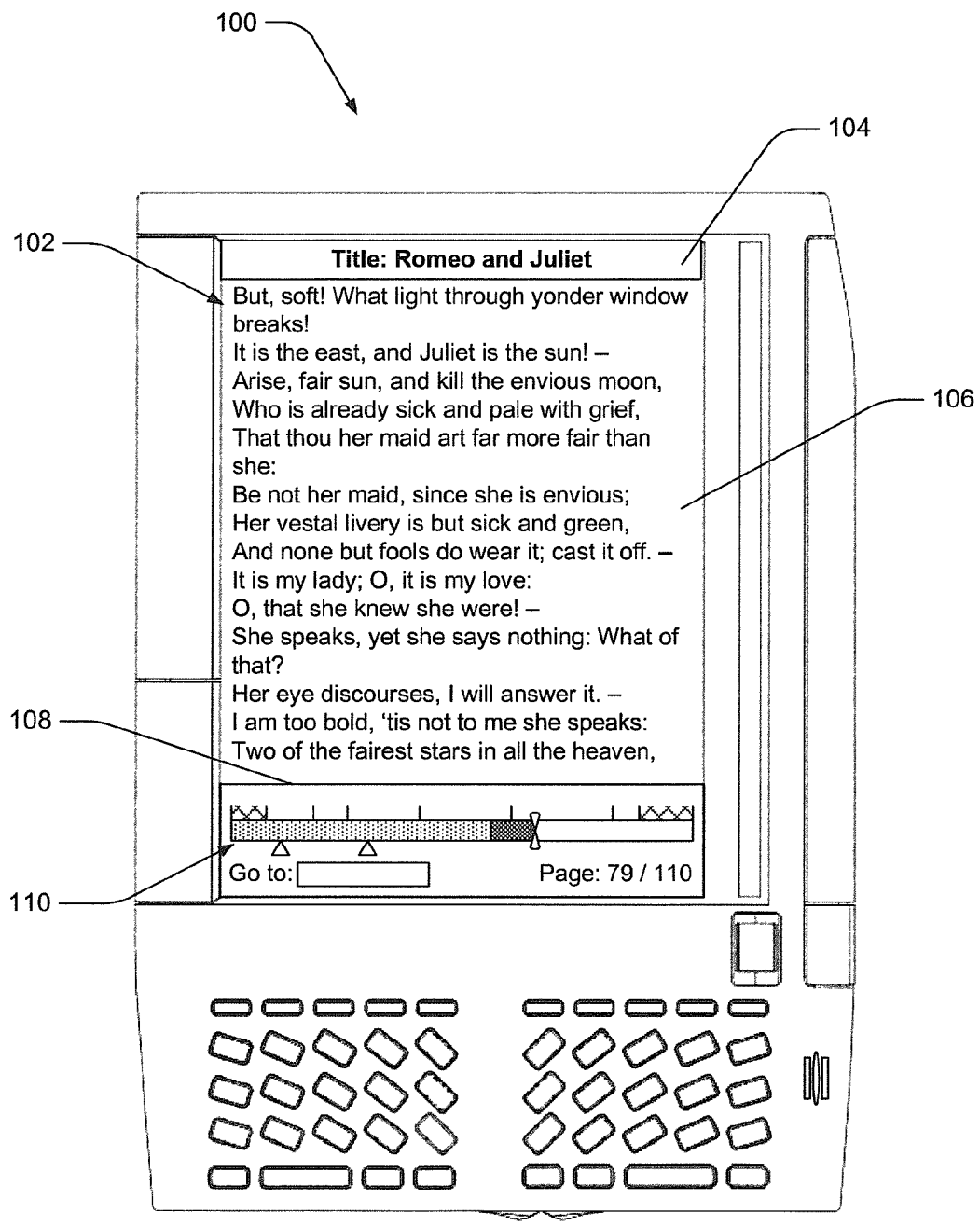
FIG. 1 is a schematic diagram of an eBook reader device displaying a digital work along with one illustrative progress gauge, in the form of a progress bar, visually indicating a user's progress through the digital work.

In some computing devices, a progress bar is used to visually show the user's location in the digital work. However, simply knowing a location in the digital work may be of limited value to a user, unless the user also knows how long the digital work is relative to some frame of reference. In addition, such progress bars typically do not provide any information about the structure or layout of the digital work. Thus, a user has no way of knowing, for example, how much of the digital work is the primary content and how much is front matter (e.g., title page, copyright page, table of contents, etc.) or back matter (e.g., appendices, indexes, glossary, etc.). Nor is the user able to see where chapters, acts, sections, or other parts of the digital work begin and end.

As mentioned above, users may find it difficult, using existing display technology, to gauge their progress through digital works. While some existing devices employ a progress bar to visually show the user's location in the digital work, this information has limited value unless the user also knows the length of the digital work relative to some frame of reference. In addition, users may desire additional information about the structure or layout of the digital work which is not apparent from the existing progress bars. This disclosure describes techniques for displaying a progress gauge indicating the user's progress through the digital work, along with additional information about the structure, content, and/or layout of the digital work. In one example, content dividers are used to divide the progress gauge into segments corresponding to sections of the digital work. Each segment of the progress gauge is sized to visually represent an amount of content in the corresponding section of the digital work, relative to other sections of the digital work.

Also described are techniques of displaying a collection of digital works available for access by a user on a device, and a progress gauge for one or more digital works in the collection of available digital works. The progress gauges enable the user to see the relative lengths of the digital works in the collection and/or the user's progress through the associated digital works.

In illustrative implementations described herein, progress gauges are described in the context of displaying electronic books ("eBook") or digital works. The terms "eBook" and "digital work" are used synonymously and, as used herein, may include any type of content which can be stored and distributed in digital form. By way of illustration, without limitation, digital works and eBooks can include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc., and all forms of audio and audiovisual works such as music, multimedia presentations, audio books, movies, etc.

Also, while the progress gauges are described in various implementations as being displayed on an eBook reader device, the concepts may be implemented in other electronic devices or electronic readers besides eBook reader devices including, for example, personal computers, portable computers (e.g., laptops or pocket PCs), personal digital assistants (PDAs), portable gaming devices, wireless phones, and the like. Similarly, while certain implementations are described in the context of presentation of textual media (e.g., reading rates, reading time, etc.), progress bars and other progress gauges are also applicable to consumption of other types of digital works, such as audio, video, multimedia, or other types of content. In addition, while progress gauges are described as visually representing a user's progress through a digital work, in some instances progress gauges may additionally or alternatively represent a user's progress through a digital work audibly or in a tactile manner.

In view of the above, this disclosure describes ways of representing a user's progress through a digital work. In one aspect, a user's progress through the digital work may be presented using a progress gauge. The progress gauge may be divided into segments using one or more content dividers. Each segment of the progress gauge may correspond to a section of the digital work, and may visually represent an amount of content in the corresponding section of the digital work, relative to other sections of the digital work. Accordingly, a user may at a glance assess his or her progress through the digital work.

In another aspect, a collection of digital works available for access by a user may be displayed. A progress bar may be presented in association with one or more of the digital works in the collection of available digital works. Each progress bar indicates a user's progress through the associated digital work. Thus, the user may readily assess his or her progress through the multiple digital works.

Illustrative Computing Device with Progress Gauge

FIG. 1 illustrates an illustrative implementation of an eBook reader device 100 having a display screen 102, on which are displayed a header pane 104, a reading pane 106, and a navigation pane 108. In other implementations, one or more of these panes may be combined, modified, or omitted as necessary or desired for a given application. The header pane 104 may be used to display a title, author, date, time, chapter, section, and/or any other pertinent data to a user. The reading pane 106 may be used to display content of an eBook or digital work for consumption by a user. The navigation pane 108 may include any of a variety of interfaces which allow a user to navigate within and among eBooks and other content stored in memory or system storage of the eBook reader device 100.

In the implementation shown in FIG. 1, the navigation pane 108 includes a progress gauge 110 configured to visually indicate the user's progress through the digital work. In addition to the user's progress through the digital work, the progress gauge 110 may convey a variety of additional information to a user. For example, the progress gauge 110 and/or navigation pane 108 may in various implementations provide information about the digital work itself (e.g., structure, content, layout of the digital work, etc.), the user's consumption of the digital work (e.g., consumption rate, consumption time, etc.), information associated with the digital work (e.g., bookmarks, annotations, size of underlying data file, etc.), or virtually any other information which might be of interest to the user. The progress gauge 110 and/or navigation pane 108 may also include a variety of controls to the user, such as navigation controls (e.g., page forward/back, manual or auto scroll, search, go to, etc.), formatting controls (e.g., change font size or type, zoom in or out on the progress gauge, etc.), or any other sort of controls which might be useful to the user.

Illustrative In-Work Progress Gauges

Figure 2A:
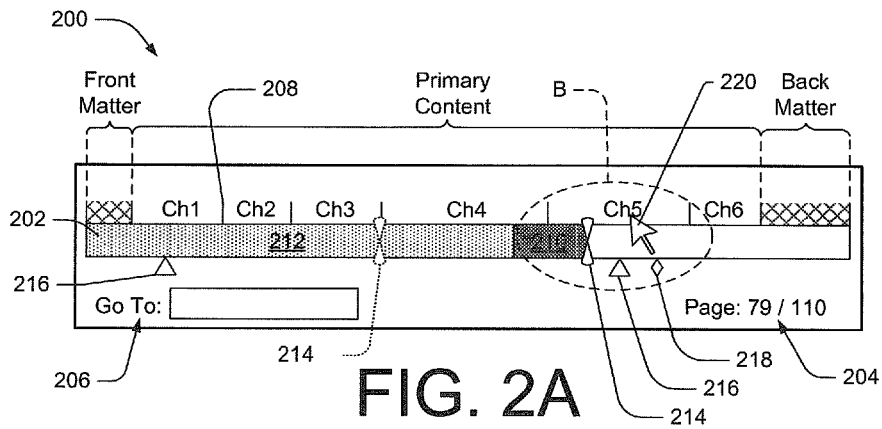
FIG. 2A is a schematic diagram showing the progress gauge of FIG. 1 in more detail.

FIG. 2A illustrates a display screen 200 including an illustrative progress gauge 202 which may be generated for display on a computing device, such as the eBook reader device 100. The progress gauge 202 in this implementation comprises a linear progress bar showing a user's progress through a digital work, a page indicator 204 showing current page and total number of pages in the digital work, and a "Go To" field 206 usable to jump to a specific location within the digital work. Of course, in other implementations, such as those described below, a variety of additional or alternative information and controls may be included in or associated with the progress gauge 202.

In the illustrated implementation, content dividers 208 are used to divide the progress bar 202 into segments corresponding to sections of the digital work. In this example, segments of the progress bar 202 correspond to primary content of the digital work, front matter (e.g., title page, copyright page, table of contents, and any other matter occurring prior to the primary content of the digital work), and back matter (e.g., appendices, indexes, glossary, end notes, and any other matter following the primary content of the digital work). In addition, the primary content, front matter, and back matter may be further divided into multiple parts (e.g., chapters, acts, scenes, sections, appendices, or other divisions), and the progress bar may include segments corresponding to the parts. However, in other implementations, progress bar segments may correspond to other sections of a digital work, such as unfolioed pages, drawings, figures, and the like. In addition, the various sections of the digital work may be shown by different colors, different shades of the same color, shading, or other designation. For example, primary content may be shown in one color, front matter in another color, back matter in another color, and unfolioed pages in still another color.

In the example shown, the progress bar 202 is divided into eight segments corresponding to front matter, six chapters of the primary content, and back matter, respectively. In the illustrated implementation, the content dividers 208 are shown as tick marks positioned along the top of the progress bar 202. However, in other implementations, any other desired shape and/or size of visual element may be used as a content divider and they content dividers may be placed in any other suitable location relative to the progress bar.

In the illustrated implementation, the segments of the progress bar 202 are sized to visually represent the relative sizes of the sections of the digital work. That is, larger sections of the digital work are generally represented by larger segments of the progress bar. This allows a user to readily see how the digital work is laid out and how large each section is relative to other sections of the digital work. This principle may be applied strictly linearly as shown in FIG. 2A, such that the largest segment of the progress bar corresponds to the largest section of the digital work (in this case Chapter 4), the second largest segment corresponds to the second largest section of the digital work (in this case Chapter 5), on down to the smallest segment, which corresponds to the smallest segment of the digital work (in this case the Front Matter). In other words the segments are sized proportionally to the sizes of the corresponding sections of the digital work.

Alternatively, segmentation of the progress bar 202 may be applied more generally in a non-linear manner. In one general segmentation example, sections of the digital work are grouped into classes (e.g., small, medium, and large) based on their size. For example, sections of a digital work smaller than a certain size (e.g., 500 units) could be classified as small, medium size sections of digital work (e.g., 500-10,000 units) could be classified as medium, and sections of the digital work larger than a certain size (e.g., 10,000 units) could be classified as large. The progress bar could then be divided into small, medium, and/or large segments according to the size of the sections of the digital work. In that case, the progress bar would still provide a general picture of the relative size of the segments, but using only segments of three different sizes. Of course, any number and size of classes may be used, depending on the level of detail, granularity, and/or segment size desired. This general segmentation approach may be appropriate where a few sections are substantially larger than the other sections of the digital work. In that case, under strict segmentation, segments corresponding to the substantially larger sections of the digital work would dominate the progress bar and segments corresponding to the smaller sections of the digital work might be difficult to discern on the progress bar due to their small size.

Another alternative would be to apply a strict segmentation approach, subject to predetermined minimum and/or maximum segment sizes. Thus, the segment sizes would be determined according to the strict segmentation approach described above, except that sections of the digital work smaller than a certain size would be represented on the progress bar by a predetermined minimum segment size, and/or sections of the digital work larger than a certain size would be represented on the progress bar by a predetermined maximum segment size. In each of the segmentation approaches described herein, the size of the digital work may be measured in a variety of ways, such as, for example, based on the number of characters, words, horizontal bands of content, bytes, multiples of bytes, or any other suitable unit of measurement.

In addition, in some implementations, the overall size of the progress bar 202 may be based on the size of the digital work relative to other digital works. That is, larger digital works would have longer progress bars than shorter digital works. This principle can again be applied strictly or generally in roughly the same manner described above for sizing the segments of the progress bar.

The progress bar 202 shows the user's progress through the digital work as a total of the user's progress during a current or most recent consumption session 210 (shown in dark stippling) and the user's progress during previous consumption sessions 212 (shown in light stippling). From this a user can easily determine not only his or her total progress through a digital work, but also how much progress he or she has made during the current or most recent consumption session. It should be understood the progress bar is not limited to the stippling shown in the figures and may include any suitable colors, shading, texture, or other visual elements which convey a user's progress through a digital work.

The progress bar 202 may also include a location slider 214 which represents a location of content presently being displayed, for example on the reading pane 106 of the eBook reader device 100. The location slider 214 generally tracks the user's progress through the digital work, at any given time designating the user's present location in the digital work. However, if the user wishes to reread a portion of the digital work, the location slider will move back to the location presently being reread, while the progress bar 202 will still show the user's overall progress through the digital work. Also, as the name suggests, in some implementations the location slider 214 may be used as a navigation tool to move to a desired section of the digital work. For example, a user desiring to reread chapter four, could move the location slider 214 to the beginning of chapter four on the progress bar (as shown in broken lines in FIG. 2A), and the corresponding content may be displayed in the reading pane 106.

The progress bar 202 may also include any number of visual elements designating bookmarks 216, annotations 218, or other information which may be of interest to the user. Of course, the visual elements used to represent bookmarks, annotations, or any other information are not limited to those illustrated, and any suitable visual elements (e.g., shapes, colors, symbols, numbers, letter, etc.) may be used. Bookmarks 216 provide a way of designating a location of interest within a digital work (e.g., a virtual tab), while annotations 218 typically provide the additional ability to append additional information to the digital work, such as a comment, citation, pointer to another location (e.g., a hyperlink) in the same or another digital work, or virtually any other information. Annotations 218 may be in a variety of formats, depending on the software and hardware provided eBook reader device 100 or other computing device. By way of example and not limitation, annotations may include textual annotations, graphical annotations (e.g., images, handwritten notes, drawings, etc.), audio annotations, video annotations, links to external references, and/or combinations of these annotation types. The annotations 218 may correspond to the digital work in general or to one or more designated portions of the digital work. Bookmarks 216 and/or annotations 218 may be authored and appended to a digital work by a source of the digital work (e.g., publisher, merchant, etc.), by the user after receipt of the digital work, and/or by one or more third party authors (e.g., other users of the digital work).

Other information which may be shown on or in connection with the progress bar 202 includes a relative density of the digital work. Density refers to the amount of content (e.g., number of characters, words, bytes, etc.) per unit of the digital work (e.g., per frame or page, per line, etc.). Changes in density may be illustrated by different colors, shades of the same color, shading, or the like. Changes in density may be shown by a continuously variable gradient or by discreet stepwise changes in color, shading, or other designation.

FIG. 2A shows two triangular visual elements corresponding to bookmarks 216 and a diamond shaped visual element corresponding to an annotation 218. In this implementation, the text or other appended content of the annotation 218 is hidden and displayed only in response to user selection of (e.g., by pointing a cursor 220) the diamond visual indicator corresponding to the annotation 218. However, in other implantations, the content of annotations may appear at all times, or be presented in any other suitable manner. Additional details of illustrative techniques of annotating digital works and presenting annotations can be found in U.S. application Ser. No. 11/039,645, filed Jan. 19, 2005, and entitled "Method and System for Providing Annotations of a Digital Work," and U.S. application Ser. No. 11/693,682, filed Mar. 29, 2007, and entitled "Providing Annotations of a Digital Work," both of which are incorporated herein by reference.

All available information may or may not be displayed on the progress bar 202 at once. For example, some of the information associated with the progress bar 202 may be suppressed to avoid cluttering the progress bar 202. This suppression may be automatic, at the request of the user, or both. In that case, suppressed details may be viewed by, for example, zooming in on a specific section of the progress bar 202. Zooming may be performed automatically, for example, upon commencement of a new section of the digital work. In that case, the progress bar 202 may zoom in to show the segment corresponding to the commenced section of the digital work in more detail. Additionally or alternatively, zooming may be performed in response to user selection (e.g., by pointing a cursor 220) of a portion of the digital work, such as the portion circled at B in FIG. 2A.

Figure 2B:
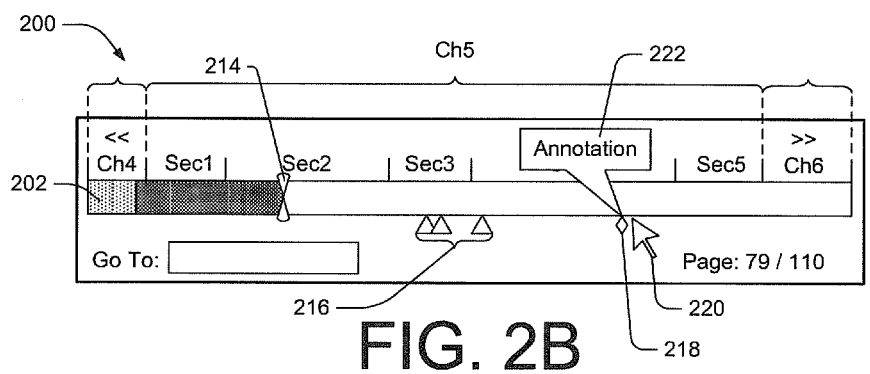
FIG. 2B is a detail view showing the portion of the progress gauge shown in region B of FIG. 1.

FIG. 2B is an expanded view of the portion B of the progress bar 202 to which the user has zoomed. As shown, the progress bar 202 now shows the progress bar segment corresponding to Chapter 5 of the digital work in more detail. In this case, Chapter 5 is further divided into five sections (Sec1-Sec5), which are also sized according to the relative size of sections of the digital work to which they correspond. The portion of the digital work prior to Chapter 5 is shown by as a single segment <<Ch4, and the portion of the digital work following Chapter 5 is shown by a single segment Ch6>>. The progress bar 202 in this view is adjusted to show the user's progress through Chapter 5. Also, what appeared as a single bookmark 216 when zoomed out (in FIG. 2A), now appears as three separate bookmarks 216 when zoomed in (in FIG. 2B). That is, visual indicators in close proximity to one another may be consolidated on the progress bar when zoomed out, to avoid clutter.

Also in FIG. 2B, content 222 of the annotation 218 is displayed in response to user selection of the diamond visual indicator of the annotation 218 with the cursor 220. Alternatively, the content 222 of the annotation 218 may be displayed in response to the zooming action and/or in response to the progress bar 202 becoming less cluttered and providing sufficient space to display the content 222. Also, while not shown in this figure, the title pane 104 (see FIG. 1) may change, in response to the zooming, to display a chapter or section title in addition to or instead of the title of the digital work (e.g., Romeo and Juliet—Act 3, Scene 1).

Figure 2C:
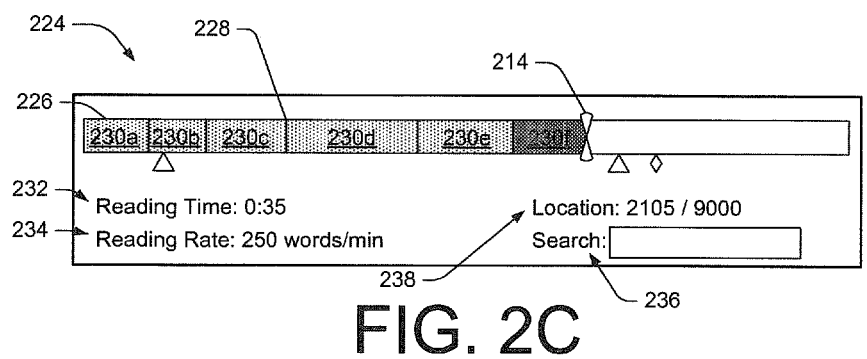
FIG. 2C is a schematic diagram showing another illustrative progress gauge in the form of a progress bar.

FIG. 2C shows a display screen 224 showing another illustrative progress bar 226. In this implementation, the progress bar 226 includes progress markers 228 indicating the user's progress through the digital work during each consumption session. In the illustrated example, the user has consumed the digital work in seven different sessions (230a-230f), the first six sessions being shown in light stippling, and the last or current session again being shown by the darker stippling.

The display screen 224 in this implementation also includes a time field 232, a rate field 234, a search field 236, and a location field 238 associated with the progress bar 226. The time field 232 in the illustrated example shows a reading time during the current session. However, the time field may designate a variety of additional or alternative time-based information, such as a total elapsed consumption time to the current point in the digital work, an elapsed time during the current consumption session, an estimated remaining time to complete the digital work or a section thereof, a simple countdown timer, a clock, or the like.

The rate field 234 in the illustrated example shows a reading rate at which the user is progressing through the digital work. However, if the digital work were other than a textual work, the rate field 234 may display another rate of consumption of the digital work. The user's reading rate may change over the course of the digital work. The variation in the reading rate may be indicated on the progress bar 226 by different colors, shading, histograms, or the like. Additionally or alternatively, the rate field may show a "cumulative" reading rate for the digital work or a section thereof, or an "instantaneous" reading rate showing the user's reading rate over a more limited period (e.g., the last ten minutes). In one example, the time field 232 may display an estimated time remaining to complete the current chapter or other section of the digital work, based on the user's cumulative or instantaneous reading rate.

The search field 236 allows the user to enter a search term to search within the digital work. In some implementations, the search field 236 may also allow the user to search contents of local memory of the eBook reader or other computing device, remote data stores, and/or the Internet.

The location field 238 displays a present location within the digital work and the total number of locations within the digital work, both in terms of invariant location reference identifiers. As mentioned above, a problem arises when attempting to identify and communicate a page or position within a digital work, due to the variable screen size, font type or size, margins, line spacing, resolution, and other variable display conditions of the computing devices. Invariant location reference identifiers, as their name suggests, make it possible to identify and communicate a specific location or segment of content in the digital work, regardless of screen size, font type or size, resolution, or other display conditions of the computing device on which the digital work is displayed. Generally, this is accomplished by assigning unique reference identifiers at locations throughout the content of a digital work, or to individual segments of the digital work. These reference identifiers are not dependent on display conditions of a computing device on which the digital work is displayed. In that sense, the reference characters are invariant.

There are numerous ways of providing invariant location reference identifiers in, or in association with, content of a digital work. In addition, there are a variety of ways in which digital works may be partitioned and assigned invariant location reference identifiers. For example, each invariant location reference identifier may be assigned to an individual character or word, a group of words, a sentence, a paragraph, a band of text of predetermined size, a unit of data, or some other division of the digital work. Additional details of invariant location reference identification schemes can be found in U.S. patent application Ser. No. 11/693,677, filed Mar. 29, 2007, and entitled "Invariant Referencing in Digital Works," which is incorporated herein by reference.

Figure 2D:
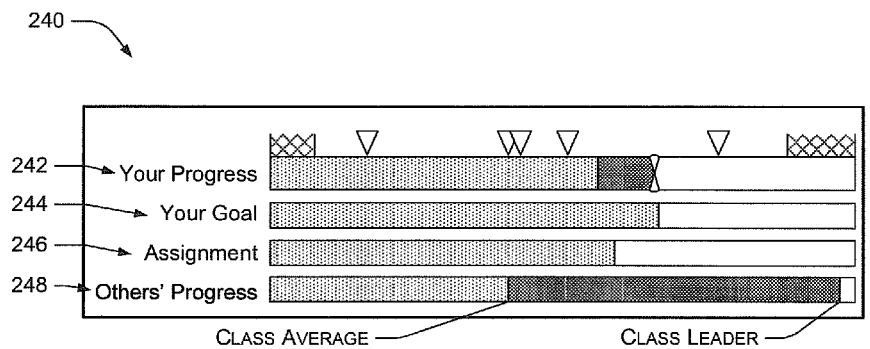
FIG. 2D is a schematic diagram showing yet another illustrative implementation having multiple progress bars.

FIG. 2D illustrates another display screen 240 including another illustrative progress bar 242. In this implementation, a number of information bars may also be provided with the progress bar 242, including a goal bar 244 illustrating a consumption goal for the user and an assignment bar 246 illustrating an assigned consumption level. By way of example, the goal bar 244 may be manually entered by the user or automatically generated based on the user's reading rate, age, or some other criteria. The assignment bar 246 may be manually entered by the user or may be assigned by a third party (e.g., a reading assignment from a professor) over a network.

Also in this implementation, a second progress bar is displayed along with the first progress bar 242. The second progress bar in this implementation comprises an "Others' Progress" bar 248, showing the progress of one or more other users. Such an "Others' Progress" bar 248 may be used by a teacher to monitor progress of individual students in a class. Alternatively, students might have an "Others' Progress" bar 248 showing the progress of their peers through a digital work. In FIG. 2D, the "Others' Progress" bar 248 illustrates a class average progress in light stippling, and a class leader progress in darker stippling. These and numerous other types of progress and/or information bars may additionally or alternatively be presented to a user of the eBook reader or other computing device.

Figure 2E:
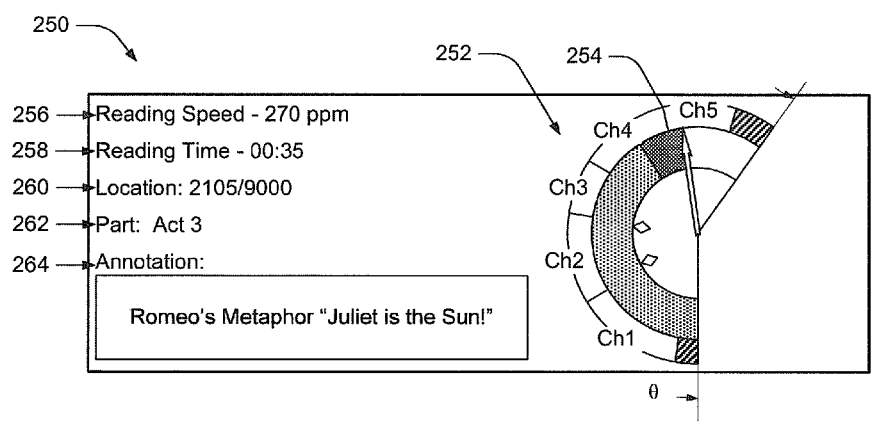
FIG. 2E is a schematic diagram showing yet another illustrative progress gauge, in the form of a semicircular progress gauge.

FIG. 2E illustrates a display screen 250 showing yet another illustrative progress gauge 252, namely a semicircular progress gauge. Progress gauges may come in a variety of shapes and sizes, including but not limited to progress bars and semicircular progress gauges. Other suitable progress gauges which may be used to visually represent a user's progress through a digital work may be apparent to those skilled in the art. The progress gauge 252 includes a number of content dividers 254 disposed around the outside of the progress gauge 252 to divide the progress gauge 252 into segments corresponding to sections of the digital work. As in the previous implementations, the segments of the progress gauge 252 are sized to visually represent the relative size of the sections of the digital work. That is, larger sections of the digital work are generally represented by larger segments of the progress gauge 252. Also, the size of the digital work, relative to other digital works, may be visually represented by the size, or in this case, the angle of the progress gauge. Larger digital works being visually represented by a larger angle θ (closer to a full circle), and smaller digital works being represented by a smaller angle θ. Additionally or alternatively, larger books may be visually represented by multiple progress gauges, or portions thereof.

In this implantation a consumption rate field 256, a consumption time field 258, and a location field 260 similar to those described with respect to the implementations above are also displayed in association with the progress gauge 252. Also in this implementation, a part field 262 is displayed, which designates a part of the digital work currently being displayed (in this case Act 3 of the digital work Romeo and Juliet), as well as an annotation field 264, which displays annotation content associated with annotation visual indicators 266 along the progress gauge 252.

While specifics of several illustrative progress gauge implementations have been described, it should be understood that elements of each of the described implementations may be combined, modified, or omitted as desired to arrive at additional progress gauges for eBook reader devices or other computing devices.

Illustrative Collection Progress Gauges

The progress gauges described above are generally displayed in connection with a specific digital work, while the digital work is being consumed ("in-work"). However, many of the same or similar features of the foregoing progress gauges are applicable to a collection of digital works as well. Details of a few such illustrative progress gauges are described below.

Figure 3:
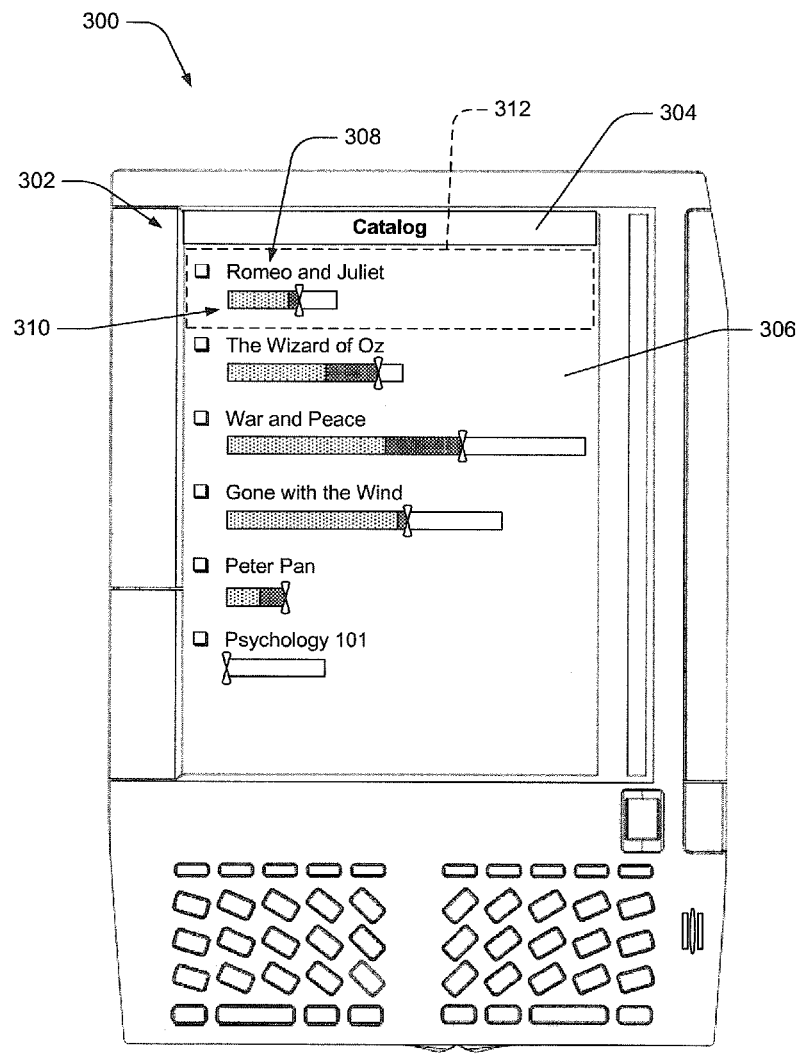
FIG. 3 is a schematic diagram of an eBook reader device displaying an illustrative collection of digital works available for access to a user of the eBook reader device, along with a progress bar showing a user's progress through each digital work in the collection.

FIG. 3 illustrates an eBook reader device 300, on which is presented an illustrative collection interface 302 of digital works available for access via the eBook reader device 300. The digital works available via the eBook reader device 300 may include digital works stored locally in memory of the eBook reader device 300 and/or remotely in memory of a remote computing device (e.g., a personal computer, another eBook reader device, a remote storage, or the like). The collection interface 302 may include a heading field 304 to identify the collection. In the illustrated implementation, only one collection is available. However, in some instances, multiple collections may be available for different types of digital works (e.g., texts, music, video, multimedia, etc.), for different genres of digital works (e.g., classics, fiction, biographies, comedies, jazz, rock, country, etc.), and/or for different users of the eBook reader or other computing device (e.g., Mom's digital works, Dad's digital works, Junior's digital works, etc.). In that case, the heading field 304 may identify which of the collections is presently being displayed.

The collection interface 302 also may include a collection field 306 including a list of available digital works. Each digital work in the list includes a title 308 or other identifier, and a progress bar 310 indicating the user's progress through the associated digital work. Where more than one digital work is included in the collection, the collection field 306 also may visually indicate the relative size of the digital works (i.e., larger works have larger progress bars than shorter works). This is illustrated in FIG. 3 by the fact that the progress bar 310 associated with the digital work War and Peace is longer than the progress bar associated with the digital work Peter Pan.

The progress bars 310 in the collection interface 302 are generally abbreviated or simplified relative to those described in the foregoing "in-work" implementations. For example, the progress bars 310 shown in FIG. 3 illustrate the user's overall progress and progress during a most recent consumption session, but do not show bookmarks, annotations, or other information which may be available on an "in-work" progress bar. However, the progress bars 310 may, in some instances, include any or all of the aspects described for the progress bars in the preceding implementations.

In some implementations, such as that shown in FIG. 3, a progress bar 310 is shown directly below each digital work in the collection. However, in other implementations, a progress bar may be presented only next to those digital works which the user has begun to consume. Additionally, the size, shape, location, colors, textures, and other characteristics of the progress bars may vary as necessary or desired for a given application. In still other implementations, progress bars may be normally hidden and only displayed in response to selection of, or pointing to, a corresponding digital work in the collection interface 302.

From the collection interface 302 the user may select one or more of the digital works listed in the collection field 306 for consumption. Selection may be accomplished in any known manner, such as by moving a selection box 312 using a thumb wheel, pointing device, touch screen, or any other suitable user input. Upon selection of a digital work from the collection interface, the digital work may be opened and displayed along with an in-work progress gauge, as shown in FIG. 1.

Figure 4:
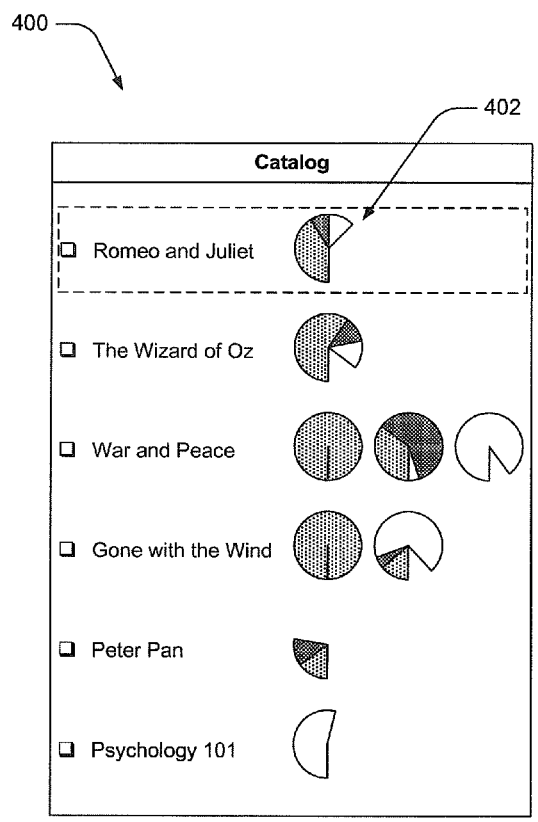
FIG. 4 is a schematic diagram showing another illustrative collection of digital works available to a user of an eBook reader device, along with a semicircular progress gauge showing a user's progress through each digital work in the collection.

FIG. 4 illustrates another illustrative collection interface 400 usable with the eBook reader 300 or other computing device. The collection interface 400 is similar to that shown in FIG. 3, except that instead of using progress bars to show a users progress through digital works, a number of circular and/or semicircular progress gauges 402 are used. In this implementation, the relative lengths of the digital works included in the collection are shown by a number of whole and/or partial circles associated with each work. The more circles or parts thereof, the longer the digital work. Each circle may represent a predetermined size (e.g., 25,000 words, 10 kilobytes, etc.), with partial circles representing fractions of a whole. The user's progress through each digital work is also shown on the progress gauges 402. In the illustrated implementation, the user's progress during a most recent consumption session is shown in dark stippling, while consumption during previous consumption sessions is shown in lighter stippling. Additional details of the collection interface 400 are the same or similar to collection interface 302 and have, therefore, been omitted for brevity.

Illustrative eBook Reader Device

Figure 5:
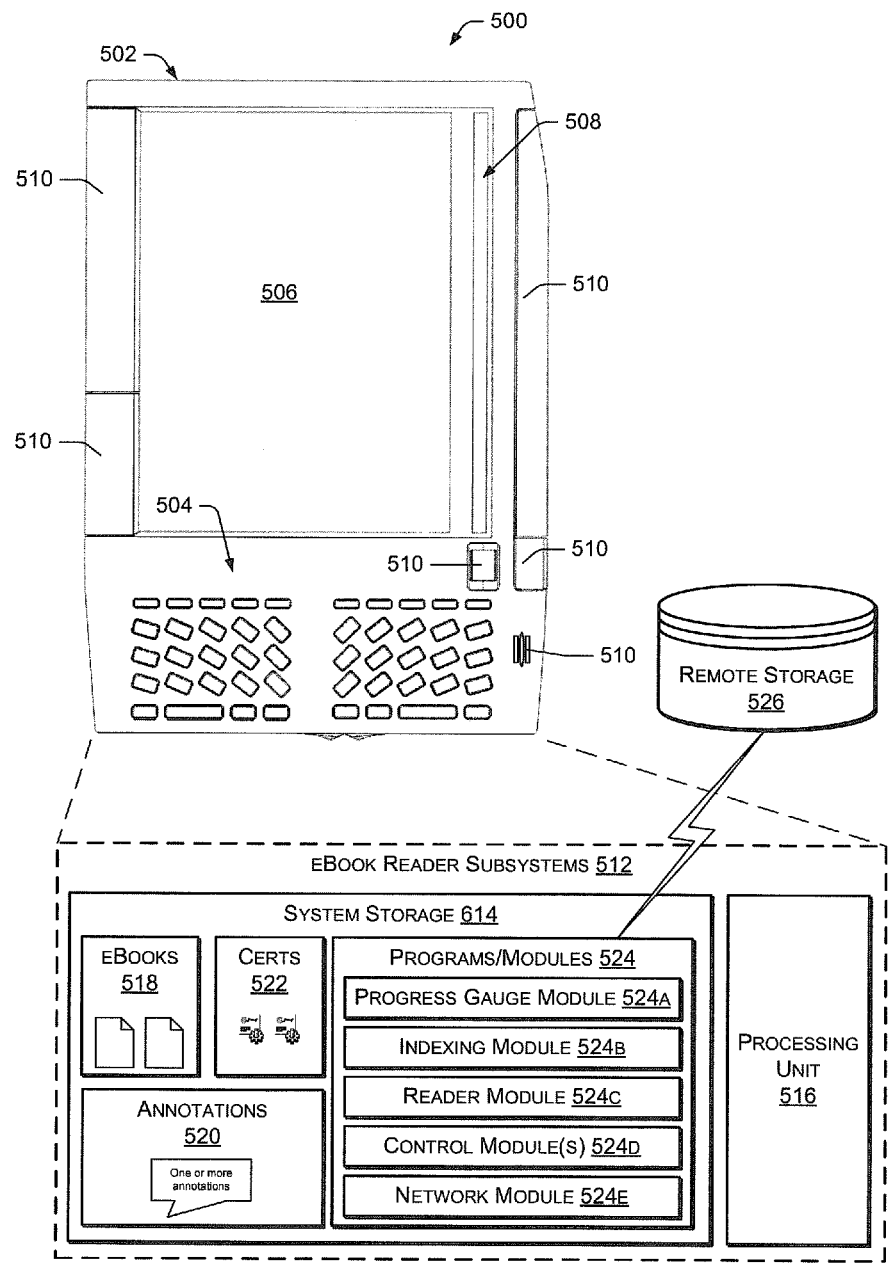
FIG. 5 is a block diagram showing various components of an illustrative eBook reader device.

FIG. 5 illustrates one illustrative eBook reader device 500 which may be used to display digital works along with any of the foregoing progress gauges. However, virtually any other type of computing device may be used. In the illustrated implementation, the device 500 is embodied as a handheld eBook reader device. Various features of the device 500 are described briefly below. However, a fuller description of this illustrative computing device may be found in U.S. patent application Ser. No. 11/277,893, filed Mar. 29, 2006, and entitled "Handheld Electronic Book Reader Device Having Dual Displays," which is incorporated herein by reference.

As shown in FIG. 5, the eBook reader device 500 has a body or housing 502, a keyboard 504, and a dual display system comprised of a first display 506 and a second display 508. The device keyboard 304 includes a plurality of alphabetic, numeric, and/or function keys for entry of user input.

The first display 506 in the dual display system presents content in a human-readable format to the user. The content presented in the first display 506 may include digital works, such as electronic books, newspapers, or other readable or viewable materials. For example, the display 506 provides the text of the electronic books and also depicts any illustrations, tables, or graphic elements which might be contained in the electronic books. In some instances, the first display 506 is implemented using electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some exemplary electronic paper displays that may be used with the implementations described herein include bi-stable LCDs, MEMS, cholesteric, pigmented electrophoretic, and others. One exemplary electronic paper display that may be used is an E Ink-brand display.

The second display 508 of the dual display system is a narrow screen located adjacent to the content display 506. The narrow display 508 is illustrated as being positioned to the right of the content display 506, although it may be located elsewhere in the housing 502 in other implementations. The narrow display screen 508 may be responsive to user input registered via, for example, a finger, a stylus, or other similar pointing device. Additionally, the narrow display screen 508 may enable presentation of graphic elements which correspond to content displayed in the content display 506.

The eBook reader device 500 may also include a variety of user inputs 510 to navigate through and among eBooks and digital works. Examples of user inputs that may be present include buttons, scroll wheels, thumb wheels, thumb sticks, sensors which detect and register movement of a user's thumb or finger, tactile sensors, or any other conventional user input mechanism.

The eBook reader device 500 also has various internal components, which are referred to generally as eBook reader subsystems 512. In one implementation, the subsystems 512 include system storage 514 and a processing unit 516. The processing unit 516 interacts with the system storage 514 to facilitate operation of the eBook reader device 500. The system storage 514 may be used to store one or more eBooks 518, annotations 520, authentication certificates 522, and other content, as well as software programs or other executable modules 524 which may be executed by the processing unit 516. Examples of such programs or modules include a progress gauge module 524a for generating and/or presenting a progress gauge, an indexing module 524b for indexing eBooks with invariant location reference identifiers, a reader module 524c, one or more control modules 524d (e.g., power management), network connection module 524e, as well as various other modules which are not shown, such as operating models, display drivers, sensor algorithms, page turn detectors, and the like. If included, the progress gauge module 524a may generate any of the progress gauges described herein. In some implementations, metadata describing the components of the progress gauge and how they should be displayed may be embedded in the digital work data file itself, attached as a separate interface data file, or otherwise appended to the digital work. In other implementations, the progress gauge module 524a may include logic to generate the progress gauge on the fly from the format and/or content of the digital work itself. Various other approaches to generating the progress gauges may also be used and will be apparent to those of ordinary skill in the art.

In addition to the system storage 514, the eBook reader device 500 may have access to one or more sources of remote storage 526 over a network or on a peer-to-peer basis. The sources of remote storage 526 may be accessible using a network connection module, for example, and may be in communication via a wired or wireless connection. The remote storage 526 may include a personal computer, another eBook reader, or any other suitable remote storage device.

The system storage 514 and remote storage 526 may include volatile memory (such as RAM), nonvolatile memory, removable memory, and/or non-removable memory, implemented in any method or technology for storage of information, such as computer-readable instructions, data structures, program modules, or other data. Also, the processing unit 516 may include onboard memory in addition to or instead of the system storage 514. Some examples of storage media which may be included in the system storage 514 and/or processing unit 516 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the eBook reader device 500. Any such computer storage media may be part of the eBook reader device 500.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various implementations. An implementation of these modules and techniques may be stored on or transmitted across some form of computer-readable media.

The above-described eBook reader device 500 or other computing devices may store software instructions that, when executed, implement aspects and features of the present invention. For example, such software can be stored on a computer-accessible medium (e.g., magnetic or optical disk or other device), or downloaded from a remote source, for loading into memory of the eBook reader 500 or other computing device to be executed by the processing unit 516.

Illustrative Method of Presenting In-Work Progress Gauges

Figure 6:
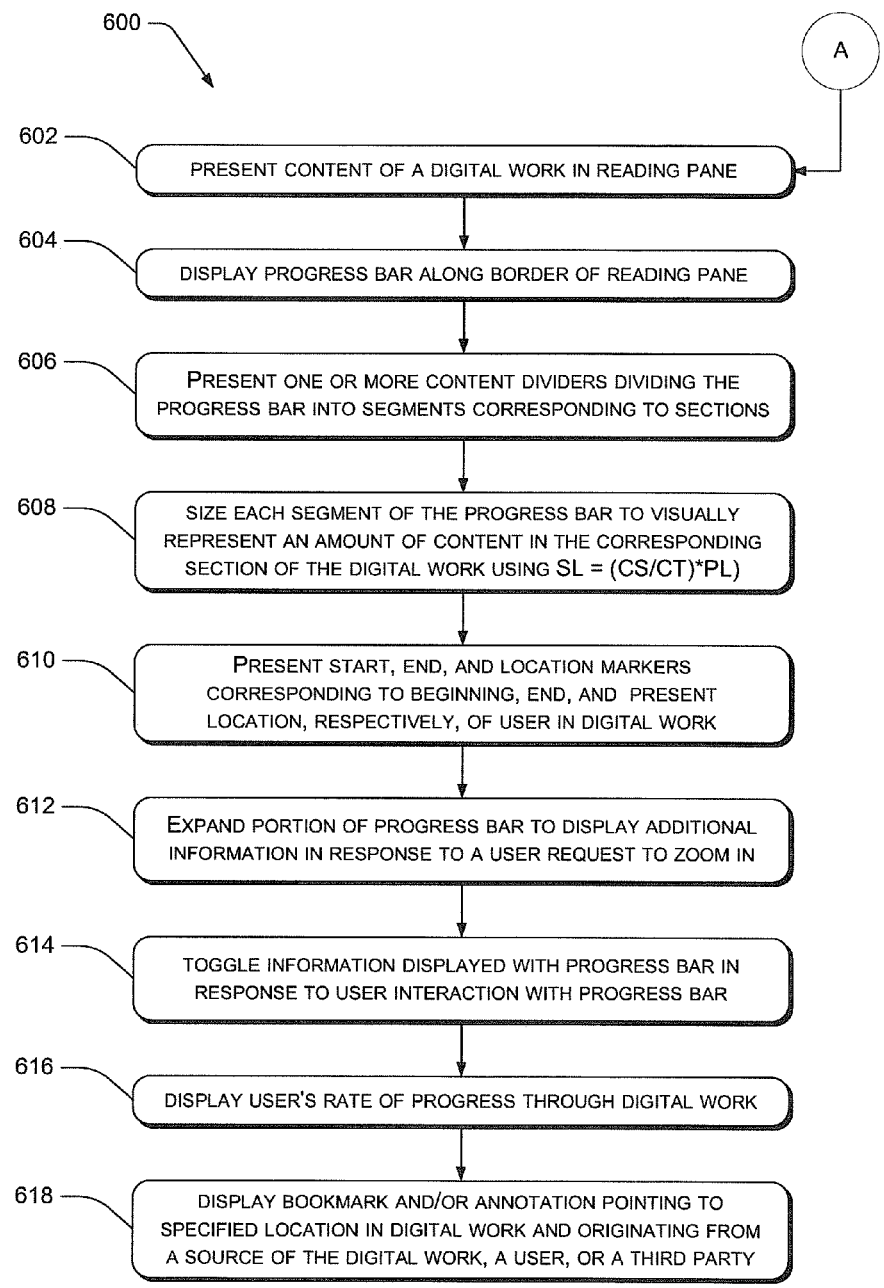
FIG. 6 is a flowchart showing an illustrative method of presenting a digital work and a progress gauge.

FIG. 6 is a flowchart showing an illustrative method 600 of presenting a progress gauge along with content of a digital work. The method 600 may be implemented using an eBook reader device, such as the one shown in FIG. 5, or any other suitable digital work computing device capable of displaying digital works.

At 602, content of a digital work is presented to a user. In the illustrated implementation, the content of the digital work (e.g., text, graphics, video, etc.) is displayed in a reading pane 106 on a display screen 102 of an eBook reader device 100 or other computing device. A progress gauge is also presented, at 604, along with the content in the reading pane 106. In some implementations, the progress gauge 110 may be presented along a border of the reading pane. However, in other implementations, the progress gauge may be positioned and sized in a variety of other manners. For example, the progress gauge may be overlaid on a portion of the content of the digital work. The progress gauge indicates the user's progress through the digital work. In some implementations, the progress gauge may also indicate the user's progress through the digital work in a most recent or current consumption session. In the described implementation, the progress gauge comprises a progress bar. However, in other implementations, the progress gauge may be semicircular, circular, triangular, square, or any other shape or size which may be used to show a user's progress through a digital work.

At 606, one or more content dividers may be presented to divide the progress bar into segments corresponding to sections of the digital work. The content dividers may be tick marks, as shown in FIG. 2A, for example, or may take the form of any other suitable visual indicator that illustrates a boundary between one segment and the next. At 608, the segments defined by the content dividers are sized to visually represent an amount of content in corresponding sections of the digital work. That is, larger segments are used to represent larger sections of the digital work, while smaller segments are used to represent smaller sections of the digital work. In some implementations, the segments are sized proportionally to the sections of the digital work that they represent. In the case where the progress gauge is a progress bar, segment length can be sized based on the size of the corresponding section of the digital work. In some implementations, the segments may be sized according to a linear function to be proportional in size to the corresponding segments of the digital work. In that case, the segments may be sized according to the following equation: $S_L = (C_S/C_T)*P_L$. $S_L$ is the segment length, $C_S$ is the amount of content in the section of the digital work corresponding to the segment, $C_T$ is the total amount of content in the digital work, and $P_L$ is the total length of the progress bar. In other implementations, however, the segments may be sized according to a non-linear function, such that the segments are non-proportional as described in more detail above in the section entitled "Illustrative In-Work Progress Gauges."

At 610, start, end, and location markers are presented to designate the beginning of the digital work, end of the digital work, and a present location of the user in the digital work, respectively. The location marker may, in some implementations, comprise a location slider, which is movable by a user to navigate to a desired location within the digital work. When not being used for navigation, the location marker typically follows the progress bar to designate the user's present location within the digital work.

Depending on the size of the digital work, the amount of information associated with the progress bar, user preference, and the like, it may be desirable to show less than all of the available information on the progress bar at a given time. For example, in some instances it may be desirable to display a progress bar of the whole digital work, showing only coarse divisions (e.g., volumes, chapters, acts, etc.) as a default. Also, multiple proximate visual indicators (e.g., bookmarks, annotations, etc.) may be consolidated in this coarse view, to avoid clutter. If desired, a portion of the progress bar corresponding to one or more sections may then be expanded, at 612, to display additional information, such as finer divisions (e.g., sections, scenes, etc.), bookmarks, annotations, and the like. This expansion may be performed automatically, for example, at the commencement of a new chapter, section, or other part of the digital work, or on the happening of some other event where expansion would be desirable. Additionally or alternatively, the expansion may be performed in response to a user request to zoom in on the expanded section of the progress bar.

Additional information may also be shown with the progress gauge in a number of other ways. For example, at 614, information on the progress bar may be toggled to display additional or alternative information. In the illustrated implementation, toggling is performed in response to user selection of the progress bar by, for example, pointing to or clicking on or near the progress bar. Toggling may also be performed automatically in response to certain circumstances (e.g., consumption of a certain type of digital work) or periodically (e.g., every thirty seconds). At 616, one such piece of additional information, a user's rate of progress through the digital work, is displayed. At 618, other additional information is displayed, in the form of one or more bookmarks and/or annotations. The bookmarks and/or annotations may be associated with, and point to, specified content in the digital work. Bookmarks and annotations may originate from a publisher, author, distributor, or other "source" of the digital work or a consumer or other "user" of the digital work subsequent to distribution or sale of the digital work.

It should be understood that certain acts in method 600 need not be performed in the order described, may be modified and/or may be omitted entirely, depending on the circumstances. For example, sizing the segments according to the equation in act 608 only applies if the progress gauge comprises a progress bar. Also, the acts of expanding 612, toggling 614, displaying progress rate 616, and displaying bookmarks and/or annotations 618, all may be omitted in various implementations.

Illustrative Method of Presenting Collection Progress Gauges

Figure 7:
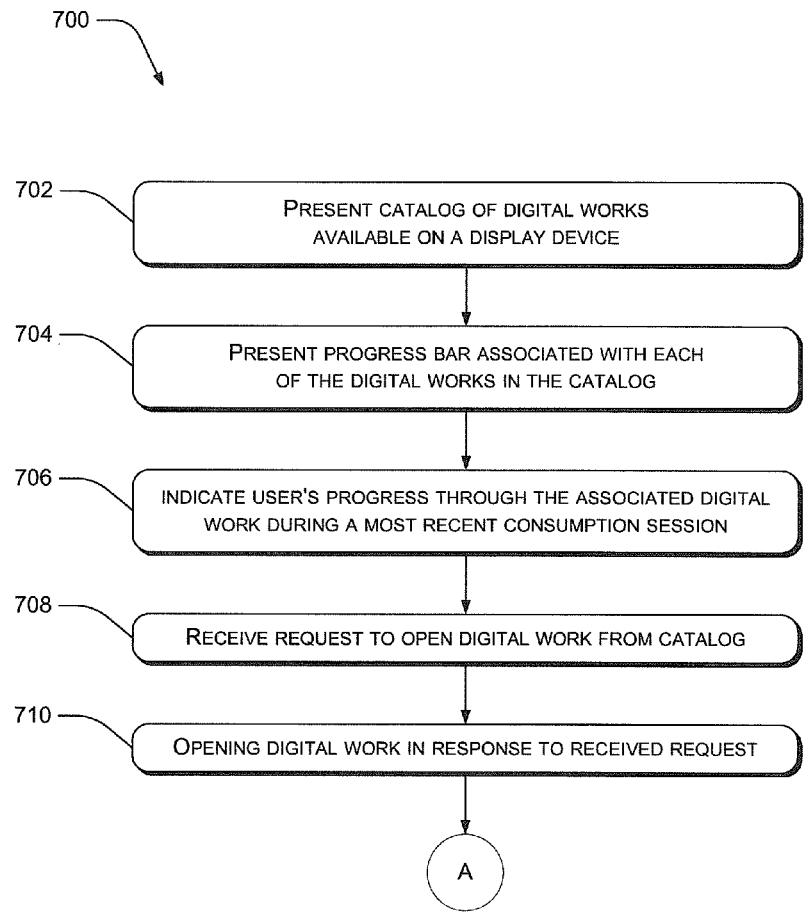
FIG. 7 is a flowchart showing an illustrative method of presenting a collection of digital works along with progress gauges showing a user's progress through each digital work in the collection of digital works.

FIG. 7 is a flowchart showing an illustrative method 700 of presenting a collection interface. The method 700 may be implemented on an eBook reader device, such as that shown in FIG. 5, or any other suitable digital work computing device capable of displaying digital works.

At 702, a collection of digital works available on the computing device is presented to the user. The collection of available digital works may include works stored in local memory of the computing device and/or remote storage, such as in memory of a personal computer, another eBook reader device, or other remote data store. A progress gauge is presented, at 704, associated with one or more of the digital works in the collection. In some implementations the progress gauge comprises a progress bar. Also in some implementations, a progress bar is associated with each digital work in the collection. However, in other implementations, only those digital works which the user has begun consuming will have a progress gauge associated with them. Each progress gauge may be presented above, below, beside, or in any other suitable location in association with the corresponding digital work.

In addition to the user's total progress through a digital work, at 706, a user's progress through the digital work during a most recent or current session is indicated on the progress gauge.

From the collection interface a user can select any of the listed digital works for consumption. At 708, a request is received by the eBook reader device to open a digital work listed in the collection and, in response, at 710, the eBook reader device opens the digital work. From here, the method proceeds at A to presentation of the digital work along with an "in-work" progress gauge, at block A in FIG. 6.

It should be understood that certain acts in method 700 need not be performed in the order described, may be modified and/or may be omitted entirely, depending on the circumstances. For example, in some instances, the act 706 of indicating a user's progress during a most recent consumption session may be omitted.

Moreover, any of the acts of any of the methods described herein may be implemented at least partially by a processor or other computing device based on instructions stored on one or more computer-readable media. Computer-readable media can be any available media which can be accessed by a preprocessing system, computing device, and/or digital work, as appropriate. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the preprocessing system, computing device, and/or digital work. Combinations of the any of the above should also be included within the scope of computer-readable media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A computer-implemented method comprising:
    identifying progress of a user through a collection of electronic books, the progress of the user being based at least in part on a number of pages that have been consumed, the collection of electronic books comprising a plurality of electronic books;
    causing display of a progress bar indicating the progress of the user through the collection of electronic books, the progress bar indicating the progress of the user by visualizing an amount of consumed text with respect to an amount of unconsumed text;
    identifying a number of sessions of consumption of an electronic book of the collection of electronic books;
    causing display of information indicating the number of sessions of consumption of the electronic book of the collection of electronic books;
    identifying an estimated amount of time to complete the electronic book of the collection of electronic books; and
    causing display of the estimated amount of time to complete the electronic book.

2. The computer-implemented method of claim 1, further comprising:
    causing display of another progress bar indicating progress of the user through the electronic book of the collection of electronic books, the other progress bar being displayed along with content of the electronic book; and
    zooming in on a section of the other progress bar that corresponds to a section of the electronic book that is currently being consumed by the user.

3. The computer-implemented method of claim 2, wherein the zooming includes zooming in on the section of the progress bar of the electronic book upon commencement of the section of the electronic book that is currently being consumed by the user.

4. The computer-implemented method of claim 1, further comprising:
    causing display of another progress bar indicating progress of the user through the electronic book of the collection of electronic books; and
    causing display of an expanded view of a portion of the other progress bar.

5. The computer-implemented method of claim 4, wherein the expanded view of the portion of the other progress bar corresponds to a section of the electronic book.

6. The computer-implemented method of claim 1, further comprising:
    causing display of another progress bar indicating progress of the user through the electronic book of the collection of electronic books; and
    causing display of, on the other progress bar, a location slider indicating a location in the electronic book where the user is currently consuming content.

7. The computer-implemented method of claim 6, wherein the causing display of the location slider includes displaying the location slider in an expanded view of a portion of the other progress bar.

8. The computer-implemented method of claim 1, further comprising:
    overlaying another progress bar on a portion of content of the electronic book of the collection of electronic book, the other progress bar indicating progress of the user through the electronic book.

9. The computer-implemented method of claim 1, further comprising:
    causing display of another progress bar indicating progress of the user through the electronic book of the collection of electronic books, the other progress bar being displayed with a visually represented segment corresponding to a section of the electronic book, the segment being sized based at least in part on a size of the section of the electronic book relative to sizes of other sections of the electronic book.

10. The computer-implemented method of claim 9, wherein a length of the segment is sized based at least in part on the size of the section of the electronic book.

11. One or more non-transitory computer-readable storage media storing computer-readable instructions that, when executed, instruct one or more processors to perform operations comprising:
    identifying progress of a user through a collection of electronic books, the progress of the user being based at least in part on a number of pages that have been consumed, the collection of electronic books comprising a plurality of electronic books;
    causing display of a progress bar indicating the progress of the user through the collection of electronic books, the progress bar indicating the progress of the user by visualizing an amount of consumed text with respect to an amount of unconsumed text;
    identifying a number of sessions of consumption of an electronic book of the collection of electronic books;
    causing display of information indicating the number of sessions of consumption of the electronic book;
    identifying an estimated amount of time to complete the electronic book of the collection of electronic books; and
    causing display of the estimated amount of time to complete the electronic book.

12. The one or more non-transitory computer-readable storage media of claim 11, the operations further comprising:
    causing display of a reading time indicating an amount of time that the user has spent consuming the electronic book during a session.

13. The one or more non-transitory computer-readable storage media of claim 11, the operations further comprising:
    causing display of a total elapsed consumption time indicating an amount of time that the user has spent consuming the electronic book to a current point of consumption in the electronic book.

14. The one or more non-transitory computer-readable storage media of claim 11, wherein the operations further comprise:
    causing display of a cumulative reading rate of the user for the electronic book.

15. The one or more non-transitory computer-readable storage media of claim 11, wherein the operations further comprise:
    causing display of a cumulative reading rate of the user for a section of the electronic book.

16. The one or more non-transitory computer-readable storage media of claim 11, wherein the operations further comprise:
    causing display of a reading rate of the user that is associated with a predetermined time period.

17. An electronic book (eBook) reader device comprising:
    a display;
    one or more processors; and
    memory storing instructions which, when executed by the one or more processors, cause the one or more processors to perform acts including:
        identifying a progress of a user through a collection of electronic books that are associated with the eBook reader device or the user, the progress of the user being based at least in part on a number pages that have been consumed in the collection of electronic books, the collection of electronic books digital works comprising a plurality of electronic books;
        identifying an estimated amount of time to complete an electronic book of the collection of electronic books;
        identifying a number of session of consumption of the electronic book;
        presenting, on the display, a progress bar indicating the progress of the user through the collection of electronic books;
        presenting, on the display, the estimated amount of time to complete the electronic book of the collection of electronic books; and
        presenting, on the display, an indication of the number of sessions of consumption of the electronic book.

18. The eBook reader device of claim 17, wherein the progress bar is presented along with another progress bar indicating progress of one or more other users in an electronic book.

19. The eBook reader device of claim 17, wherein the acts further include:
    presenting, on the display, a cumulative reading rate of the user for the electronic book of the collection of electronic books.

* * * * *